(12) United States Patent
Nishi et al.

(10) Patent No.: US 7,916,970 B2
(45) Date of Patent: Mar. 29, 2011

(54) IMAGE PROCESSING APPARATUS, METHOD OF SAME, AND PROGRAM FOR SAME

(75) Inventors: Toru Nishi, Kanagawa (JP); Kazuhiko Ueda, Kanagawa (JP); Mitsuyasu Asano, Tokyo (JP)

(73) Assignee: SONY Corporation, Tokyo (JP)

( * ) Notice: Subject to any disclaimer, the term of this patent is extended or adjusted under 35 U.S.C. 154(b) by 1055 days.

(21) Appl. No.: 11/715,361

(22) Filed: Mar. 8, 2007

(65) Prior Publication Data
US 2007/0217706 A1    Sep. 20, 2007

(30) Foreign Application Priority Data

Mar. 17, 2006    (JP) ................ P2006-075514

(51) Int. Cl.
*G06K 9/40* (2006.01)
(52) U.S. Cl. ......... 382/275; 382/254; 382/274; 382/266
(58) Field of Classification Search .............. 382/275
See application file for complete search history.

(56) References Cited

U.S. PATENT DOCUMENTS

| | | | | |
|---|---|---|---|---|
| 5,790,764 A * | 8/1998 | Suzuki | ............ | 358/1.9 |
| 5,799,100 A | 8/1998 | Clarke et al. | | |
| 6,507,364 B1 * | 1/2003 | Bishay et al. | ........ | 348/242 |
| 2002/0171873 A1 * | 11/2002 | Chang | ............ | 358/3.06 |
| 2003/0007183 A1 * | 1/2003 | Ishiguro | ........ | 358/2.1 |
| 2003/0007186 A1 | 1/2003 | Suino et al. | | |
| 2003/0142865 A1 * | 7/2003 | Hirota et al. | ........ | 382/167 |
| 2003/0169941 A1 * | 9/2003 | Lin et al. | ........ | 382/266 |
| 2005/0068334 A1 * | 3/2005 | Chang et al. | ........ | 345/617 |

FOREIGN PATENT DOCUMENTS

| | | |
|---|---|---|
| EP | 1 349 113 A2 | 10/2003 |
| EP | 1 589 763 A2 | 10/2005 |
| EP | 1 530 364 A1 | 11/2005 |
| EP | 1 349 113 A3 | 11/2006 |
| JP | 9-311937 | 12/1997 |
| JP | 2004-272657 | 9/2004 |

OTHER PUBLICATIONS

Translation for JP 09-311937.*
European Search Report mailed Mar. 26, 2010, in EP 07 10 4292.

* cited by examiner

*Primary Examiner* — Vikkram Bali
*Assistant Examiner* — Michelle Entezari
(74) *Attorney, Agent, or Firm* — Finnegan, Henderson, Farabow, Garrett & Dunner LLP

(57) ABSTRACT

An image processing apparatus is configured to carry out image processing on image data including pixel values of a plurality of pixels disposed on a plane defined in a horizontal direction and a vertical direction. The apparatus includes horizontal-direction image-processing means for carrying out image processing in the horizontal direction on a pixel value of a target pixel that is included in the image data; vertical-direction image-processing means for carrying out image processing in the vertical direction on the pixel value of the target pixel; diagonal-direction image-processing means carrying out image processing in a predetermined diagonal direction on the pixel value of the target; correction-value determination means for determining the correction value of the pixel value on the basis of processing results obtained by each means; and correction means correcting the pixel value of the target pixel.

6 Claims, 18 Drawing Sheets

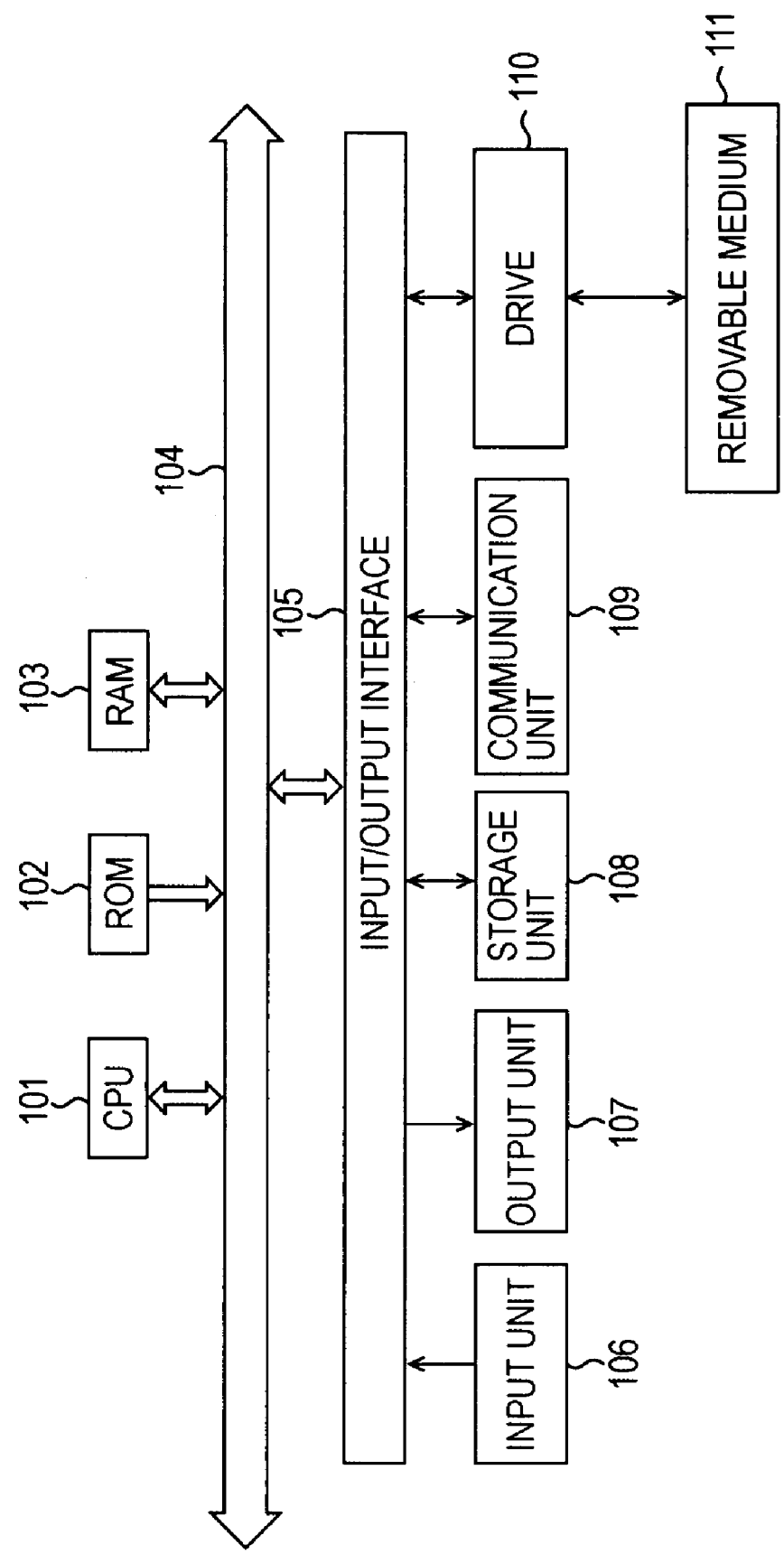

IMAGE PROCESSING APPARATUS, METHOD OF SAME, AND PROGRAM FOR SAME

CROSS REFERENCES TO RELATED APPLICATIONS

The present invention contains subject matter related to Japanese Patent Application JP 2006-075514 filed in the Japanese Patent Office on Mar. 17, 2006, the entire contents of which are incorporated herein by reference.

BACKGROUND OF THE INVENTION

1. Field of the Invention

The present invention relates to an image processing apparatus, a method of the same, and a program for the same and, more specifically, relates to an image processing apparatus a method of the same, and a program that are capable of efficiently expanding from one-dimensional image processing to two-dimensional image processing.

2. Description of the Related Art

As image processing carried out on a target pixel to be processed (hereinafter simply referred to as the "target pixel") included in a plurality of pixels constituting an image, there is known image processing using pixel values of a plurality of pixels (including the target pixel) arranged in the horizontal direction or the vertical direction. Hereinafter, such image processing is referred to as "one-dimensional image processing."

As image processing carried out on the pixel value of the target pixel, there is known image processing using the pixels values of a plurality of pixel (including the target pixel) included in a predetermined two-dimensional area. Hereinafter, such image processing is referred to as "two-dimensional image processing."

Normally, to carry out two-dimensional image processing, a method of expanding one-dimensional image processing is employed. As such methods, there are known methods in which a filter is two-dimensionally converted and in which one-dimensional image processing is carried out in the horizontal direction and in the vertical direction and the processing results thereof are added together (for example, refer to Japanese Unexamined Patent Application Publication No. 2004-272657).

SUMMARY OF THE INVENTION

When the former method is employed for carrying out the processing, i.e., when an image processing apparatus that carries out processing employing a two-dimensional matrix (hereinafter referred to as a "two-dimensional filtering") is employed, there are no problems. However, when it is necessary to employ an image processing apparatus that is not capable of carrying out two-dimensional filtering, the problems described below occur.

To carry out two-dimensional image processing without using two-dimensional filtering, the latter method, i.e., a method of combining the results of one-dimensional image processing carried out only in the horizontal direction and one-dimensional image processing carried out only in the vertical direction is employed.

When image correction is carried out in accordance with such a method, problems such as over-correction and unprocessed areas (areas that are not corrected) may occur. In other words, such a method does not allow the processing to be efficiently expanded from one-dimensional image processing to two-dimensional image processing.

The present invention has taken into consideration such problems and provides a method of efficiently expanding from one-dimensional image processing to two-dimensional image processing, without using two-dimensional filtering.

An image processing apparatus according to an embodiment of the present invention is configured to carry out image processing on image data including pixel values of a plurality of pixels disposed on a plane defined in a horizontal direction and a vertical direction, the apparatus includes horizontal-direction image-processing means for carrying out image processing on a pixel value of a target pixel to be processed, the target pixel being included in the pixels values included in the image data, the image processing being carried out by using pixel values of a plurality of pixels, including the target pixel, disposed in the horizontal direction; vertical-direction image-processing means for carrying out image processing on the pixel value of the target pixel by using pixels values of a plurality of pixels, including the target pixel, disposed in the vertical direction; diagonal-direction image-processing means for carrying out image processing on the pixel value of the target pixel by using pixels values of a plurality of pixels, including the target pixel, disposed in a predetermined diagonal direction different from the horizontal direction and the vertical direction; correction-value determination means for determining the correction value of the pixel value of the target pixel on the basis of processing results obtained by the horizontal-direction image-processing means, the vertical-direction image-processing means, and the diagonal-direction image-processing means; and correction means for correcting the pixel value of the target pixel by adding the correction value determined by the correction-value determination means to the pixel value of the target pixel.

The diagonal-direction image-processing means includes 45-degree left diagonal-direction image processing means for carrying out image processing on the pixel value of the target pixel by using pixels values of a plurality of pixels, including the target pixel, disposed in a 45-degree left diagonal direction with respect to the horizontal direction, and 45-degree right diagonal-direction image processing means for carrying out image processing on the pixel value of the target pixel by using pixels values of a plurality of pixels, including the target pixel, disposed in a 45-degree right diagonal direction with respect to the horizontal direction.

The image processing apparatus may further include changing means for changing processing results obtained by the horizontal-direction image-processing means, the vertical-direction image-processing means, the 45-degree left diagonal-direction image processing means, and the 45-degree right diagonal-direction image processing means on the basis of a correction direction of the target pixel and a correction index value used as an index for the correction value, wherein the correction-value determination means determines the correction value of the pixel value of the target pixel on the basis of the processing results obtained by the horizontal-direction image-processing means, the vertical-direction image-processing means, the 45-degree left diagonal-direction image processing means, and the 45-degree right diagonal-direction image processing means, the processing results being changed by the changing means.

The changing means may set a vector in the correction direction of the target pixel having a length corresponding to the correction index value as a correction index vector, resolves the correction index vector into vectors in the horizontal direction, the vertical direction, the 45-degree left diagonal direction, and the 45-degree right diagonal direction and may change processing results obtained by the horizontal-direction image-processing means, the vertical-direction image-processing means, the 45-degree left diagonal-direction image processing means, and the 45-degree right diagonal-direction image processing means on the basis of the vectors in the horizontal direction, the vertical direction, the 45-degree left diagonal direction, and the 45-degree right diagonal direction, the vectors being obtained by resolving the correction index vector.

The image processing apparatus may further include movement vector detection means for detecting a movement vector of the target pixel, wherein the image data is image data on a predetermined access unit of a plurality of access units constituting a moving image, and wherein the changing means uses the movement vector detected by the movement vector detection means as the correction index vector of the target pixel.

A method of image processing for processing image data including pixel values of a plurality of pixels disposed on a plane defined in a horizontal direction and a vertical direction or a program executed by a computing controlling image processing on data including pixel values of a plurality of pixels disposed on a plane defined in a horizontal direction and a vertical direction, the method or program including the steps of carrying out image processing on a pixel value of a target pixel to be processed, the target pixel being included in the pixels values included in the image data, the image processing being carried out by using pixel values of a plurality of pixels, including the target pixel, disposed in the horizontal direction; carrying out image processing on the pixel value of the target pixel by using pixels values of a plurality of pixels, including the target pixel, disposed in the vertical direction; carrying out image processing on the pixel value of the target pixel by using pixels values of a plurality of pixels, including the target pixel, disposed in a predetermined diagonal direction different from the horizontal direction and the vertical direction; determining the correction value of the pixel value of the target pixel on the basis of processing results obtained by the horizontal-direction image-processing means, the vertical-direction image-processing means, and the diagonal-direction image-processing means; and correcting the pixel value of the target pixel by adding the correction value determined by the correction-value determination means to the pixel value of the target pixel.

According to an embodiment of the present invention, the following image processing is carried out on data including pixel values of a plurality of pixels disposed on a plane defined in a horizontal direction and a vertical direction, the processing including the steps of carrying out image processing on a pixel value of a target pixel to be processed, the target pixel being included in the pixels values included in the image data, the image processing being carried out by using pixel values of a plurality of pixels, including the target pixel, disposed in the horizontal direction; carrying out image processing on the pixel value of the target pixel by using pixels values of a plurality of pixels, including the target pixel, disposed in the vertical direction; carrying out image processing on the pixel value of the target pixel by using pixels values of a plurality of pixels, including the target pixel, disposed in a predetermined diagonal direction different from the horizontal direction and the vertical direction; determining the correction value of the pixel value of the target pixel on the basis of processing results obtained by the horizontal-direction image-processing means, the vertical-direction image-processing means, and the diagonal-direction image-processing means; and correcting the pixel value of the target pixel by adding the correction value determined by the correction-value determination means to the pixel value of the target pixel.

As described above, the present invention enables correction by two-dimensional image processing to be carried out on pixel values of pixels included in image data. In particular, the present invention enables efficient expansion from one-dimensional image processing to two-dimensional image processing, without using two-dimensional filtering.

BRIEF DESCRIPTION OF THE DRAWINGS

FIG. 18 is a block diagram illustrating the total or partial hardware structure of an image processing apparatus according to another embodiment of the present invention.

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 7:
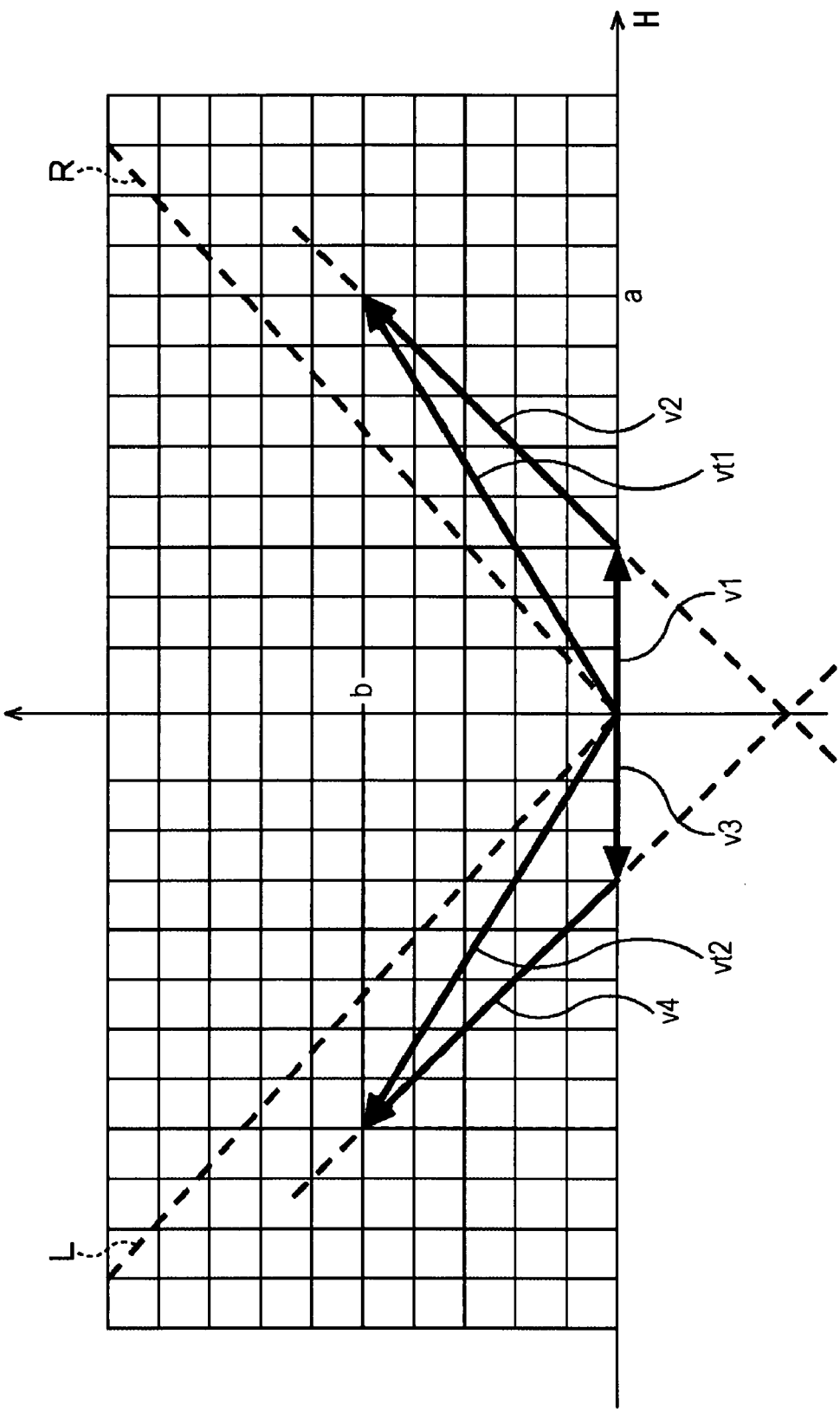
FIG. 7 illustrates an image processing method according to an embodiment of the present invention.

An image processing apparatus (for example, an image processing apparatus shown in FIG. 8, 10, or 11) according to an embodiment of the present invention is configured to carry out image processing on image data including pixel values of a plurality of pixels disposed on a plane defined in a horizontal direction and a vertical direction (for example, a plane defined in a horizontal direction H and a vertical direction V, as shown in FIG. 7), the apparatus includes horizontal-direction image-processing means (for example, a horizontal correction unit 21 shown in FIG. 8, 10, or 11) for carrying out image processing on a pixel value of a target pixel to be processed, the target pixel being included in the pixels values included in the image data, the image processing being carried out by using pixel values of a plurality of pixels, including the target pixel, disposed in the horizontal direction; vertical-direction image-processing means (for example, a vertical correction unit 22 shown in FIG. 8, 10, or 11) for carrying out image processing on the pixel value of the target pixel by using pixels values of a plurality of pixels, including the target pixel, disposed in the vertical direction; diagonal-direction image-processing means (for example, a left-diagonal correction unit 23 shown in FIG. 8, 10, or 11) for carrying out image processing on the pixel value of the target pixel by using pixels values of a plurality of pixels, including the target pixel, disposed in a predetermined diagonal direction different from the horizontal direction and the vertical direction; correction-value determination means (for example, a total correction unit 30 shown in FIG. 8, a total correction unit 35 shown in FIG. 10, or a total correction unit 42 shown in FIG. 11) for determining the correction value of the pixel value of the target pixel on the basis of processing results obtained by the horizontal-direction image-processing means, the vertical-direction image-processing means, and the diagonal-direction image-processing means; and correction means (for example, an addition unit 31 shown in FIG. 8, 10, or 11) for correcting the pixel value of the target pixel by adding the correction value determined by the correction-value determination means to the pixel value of the target pixel.

Figure 8:
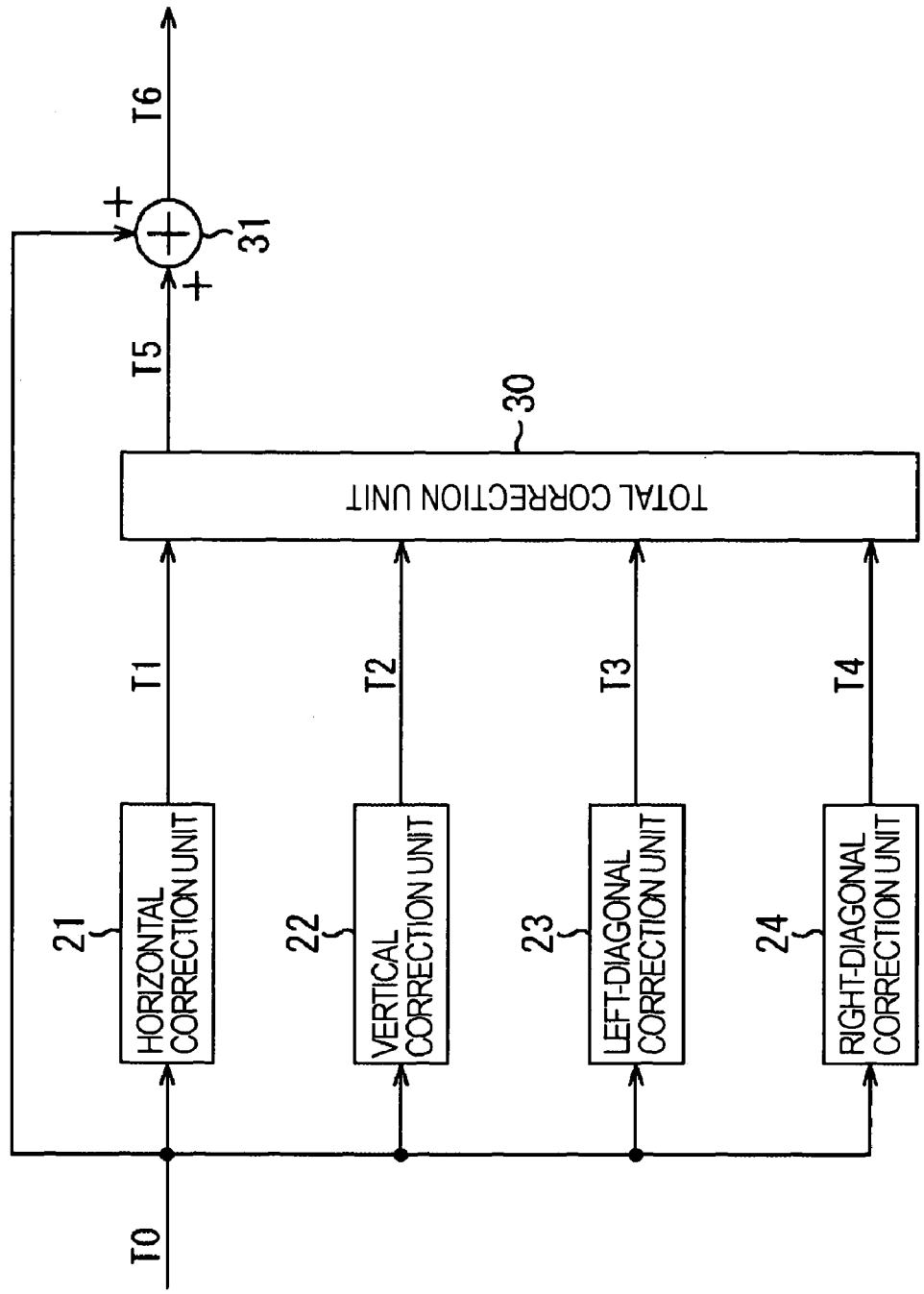
FIG. 8 is a block diagram illustrating the functional structure of an image processing apparatus according to an embodiment of the present invention.
Figure 10:
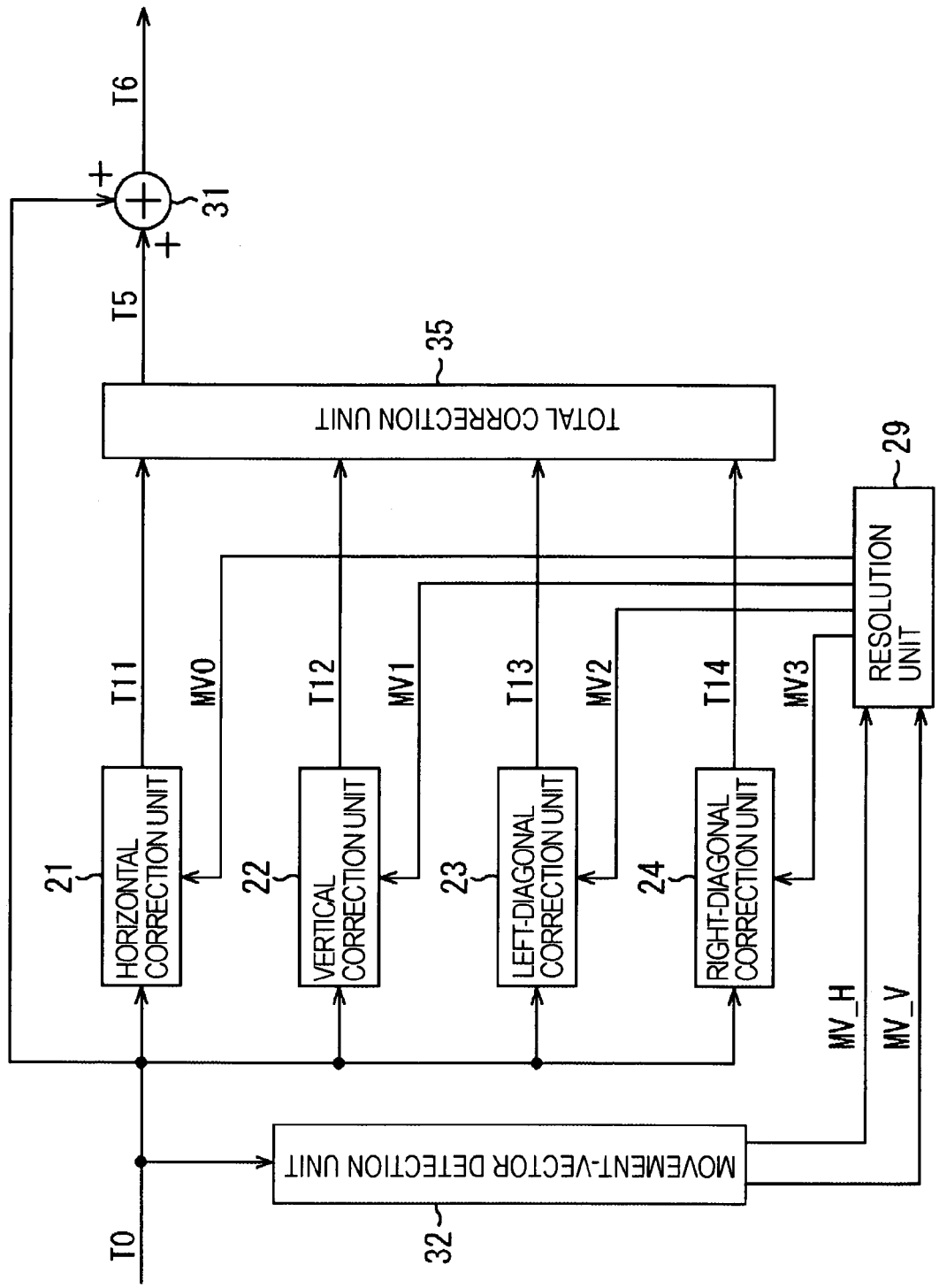
FIG. 10 is a block diagram illustrating the functional structure of an image processing apparatus according to another embodiment of the present invention.

The diagonal-direction image-processing means includes 45-degree left diagonal-direction image processing means (for example, a left-diagonal correction unit 23 shown in FIG. 8, 10, or 119 for carrying out image processing on the pixel value of the target pixel by using pixels values of a plurality of pixels, including the target pixel, disposed in a 45-degree left diagonal direction (for example, a direction parallel to a line L shown in FIG. 7) with respect to the horizontal direction, and 45-degree right diagonal-direction image processing means (for example, a right-diagonal correction unit 24 shown in FIG. 8, 10, or 11) for carrying out image processing on the pixel value of the target pixel by using pixels values of a plurality of pixels, including the target pixel, disposed in a 45-degree right diagonal direction (for example, a direction parallel to a line R shown in FIG. 7) with respect to the horizontal direction.

Figure 9:
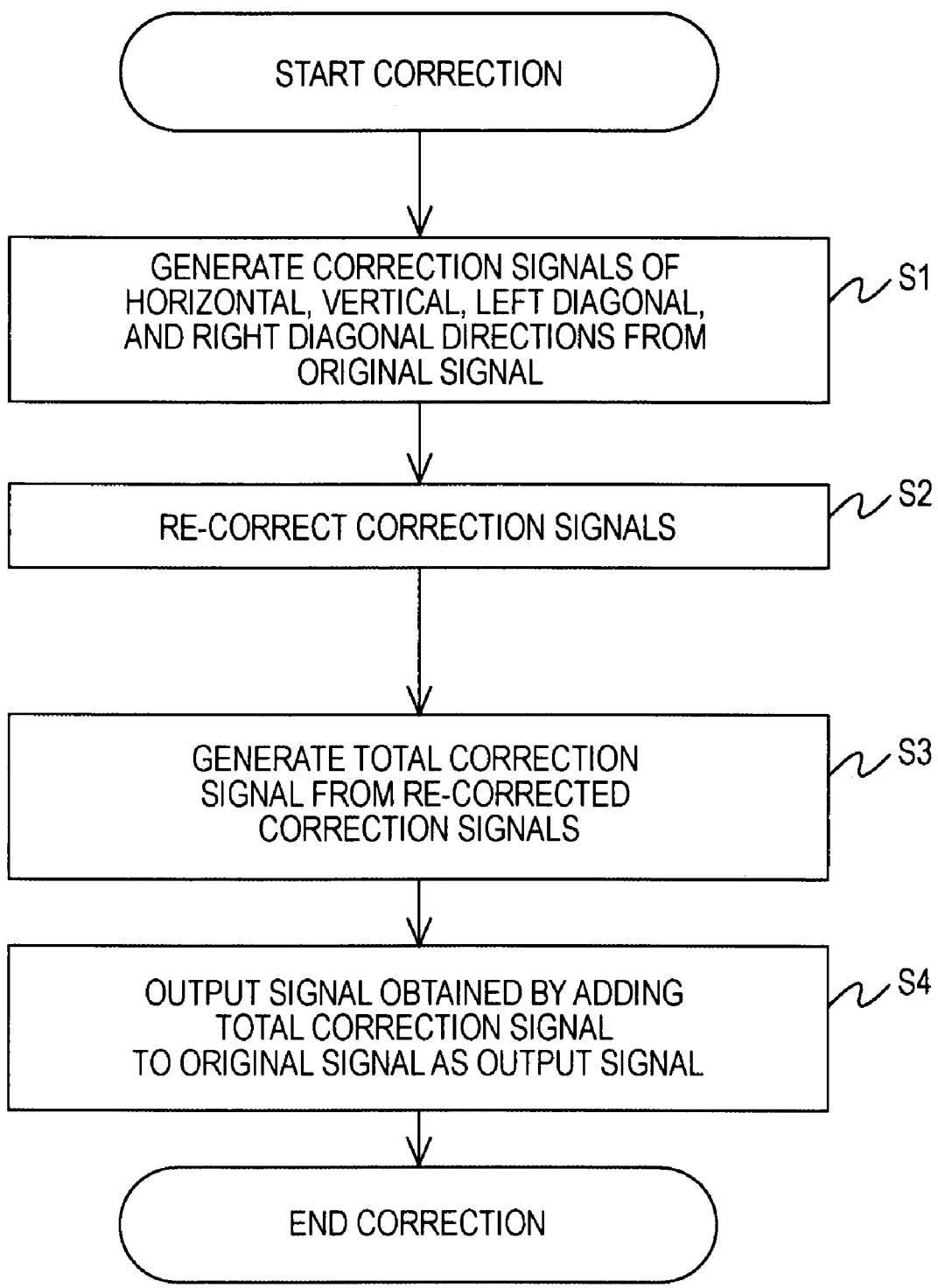
FIG. 9 is a flowchart illustrating a correction process carried out by the image processing apparatus illustrated in FIG. 8.
Figure 11:
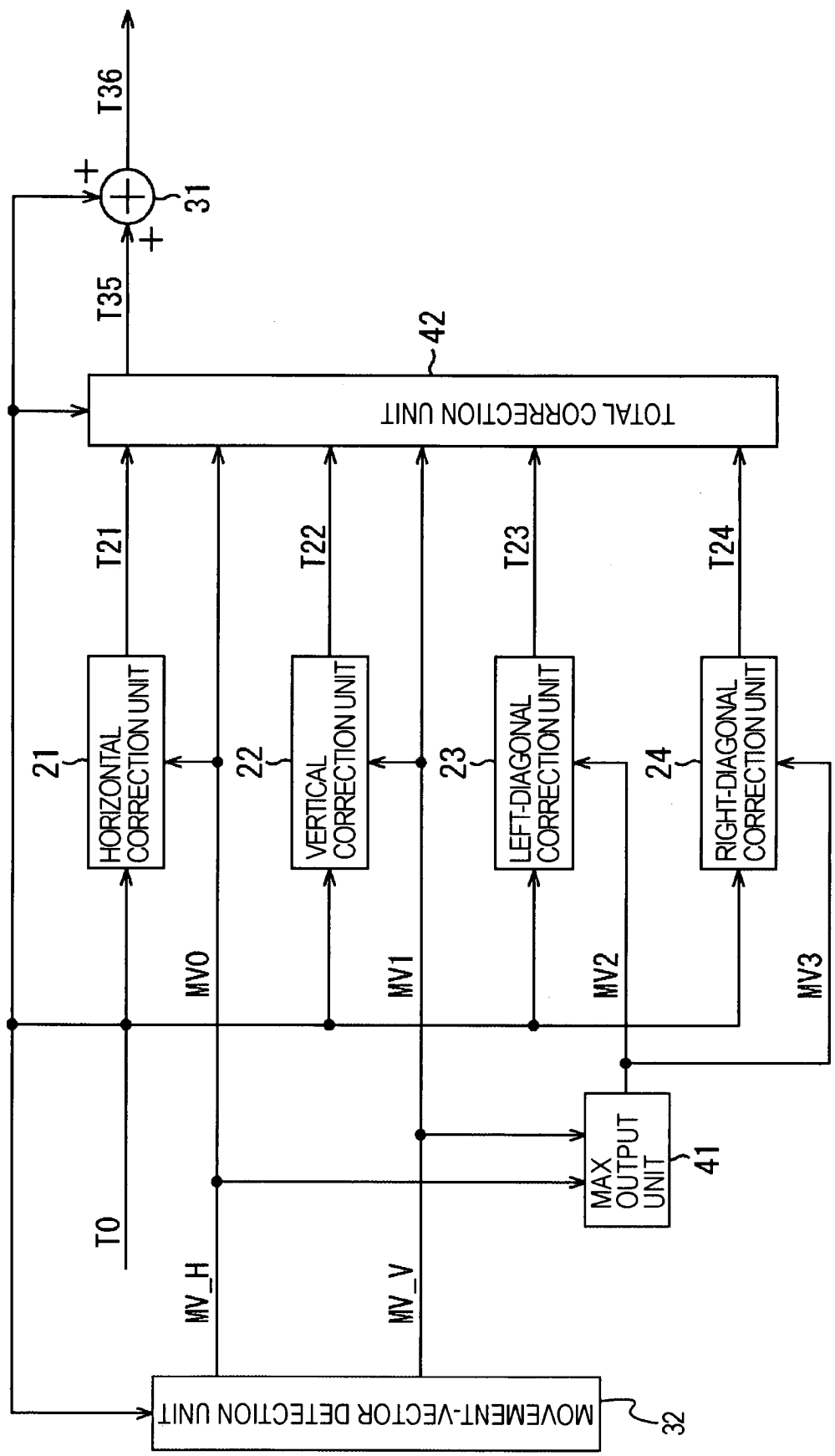
FIG. 11 is a block diagram illustrating the functional structure of an image processing apparatus according to another embodiment of the present invention.

The image processing apparatus further includes changing means (for example, a component for carrying out Step S2 of a process shown in FIG. 9 included in each of the total correction unit 30 shown in FIG. 8, the total correction unit 35 shown in FIG. 10, and the total correction unit 42 shown in FIG. 11, or, more specifically, for example, a horizontal/vertical correction-value determination unit 51 or a left/right-diagonal correction-value determination unit 52 included in the total correction unit 42 shown in FIG. 11) for changing processing results obtained by the horizontal-direction image-processing means, the vertical-direction image-processing means, the 45-degree left diagonal-direction image processing means, and the 45-degree right diagonal-direction image processing means on the basis of a correction direction of the target pixel and a correction index value used as an index for the correction value, wherein the correction-value determination means determines the correction value of the pixel value of the target pixel on the basis of the processing results obtained by the horizontal-direction image-processing means, the vertical-direction image-processing means, the 45-degree left diagonal-direction image processing means, and the 45-degree right diagonal-direction image processing means, the processing results being changed by the changing means.

The changing means sets a vector in the correction direction of the target pixel having a length corresponding to the correction index value (for example, a vector vt1 shown in FIG. 7) as a correction index vector, resolves the correction index vector into vectors in the horizontal direction, the vertical direction, the 45-degree left diagonal direction, and the 45-degree right diagonal direction, and changes processing results obtained by the horizontal-direction image-processing means, the vertical-direction image-processing means, the 45-degree left diagonal-direction image processing means, and the 45-degree right diagonal-direction image processing means on the basis of the vectors in the horizontal direction, the vertical direction, the 45-degree left diagonal direction, and the 45-degree right diagonal direction (for example, a vector v1 in the horizontal direction, zero vectors in the vertical direction and the 45-degree left diagonal direction, and a vector v2 in the 45-degree right diagonal direction of the correction index vector Vt1 shown in FIG. 7), the vectors being obtained by resolving the correction index vector.

The image processing apparatus further including movement vector detection means (for example, a movement-vector detection unit 32 shown in FIG. 10) for detecting a movement vector of the target pixel, wherein the image data is image data on a predetermined access unit of a plurality of access units constituting a moving image, and wherein the changing means uses the movement vector detected by the movement vector detection means as the correction index vector of the target pixel.

An image processing method for an image processing apparatus (for example, an image processing apparatus shown in FIG. 8, 10, or 11) according to an embodiment of the present invention, the method being for processing image data including pixel values of a plurality of pixels disposed on a plane defined in a horizontal direction and a vertical direction, the method including the steps of carrying out image processing on a pixel value of a target pixel to be processed, the target pixel being included in the pixels values included in the image data, the image processing being carried out by using pixel values of a plurality of pixels, including the target pixel, disposed in the horizontal direction; carrying out image processing on the pixel value of the target pixel by using pixels values of a plurality of pixels, including the target pixel, disposed in the vertical direction; carrying out image processing on the pixel value of the target pixel by using pixels values of a plurality of pixels, including the target pixel, disposed in a predetermined diagonal direction different from the horizontal direction and the vertical direction (for example, Step S1 of a process shown in FIG. 9); determining the correction value of the pixel value of the target pixel on the basis of processing results obtained by the horizontal-direction image-processing means, the vertical-direction image-processing means, and the diagonal-direction image-processing means (for example, Step S3 of a process shown in FIG. 9); and correcting the pixel value of the target pixel by adding the correction value determined by the correction-value determination means to the pixel value of the target pixel (for example, Step S4 of a process shown in FIG. 9).

A program according to an embodiment of the present invention corresponds to the above-described image processing method according to another embodiment of the present invention. As described in detail below, the program is recorded on, for example, a recording medium, such as a removable medium 111 or a hard disk included in a storage unit 108, shown in FIG. 18, and is executed by a computer having the configuration illustrated in FIG. 18.

A recording medium storing a program according to an embodiment of the present invention is also included in the scope of the present invention.

The above-described image processing apparatus according to an embodiment of the present invention can be used as, for example, a television system or a component thereof. A television system is a system constituting at least one audio and visual (AV) apparatus including a television broadcasting image reception device.

Now, a known method of expanding from one-dimensional image processing to two-dimensional image processing will be described. The known method is one of the two above-described methods in which two-dimensional filtering is not employed. In other words, according to this known method, correction (i.e., one-dimensional image processing) in horizontal and vertical directions is carried out, and the correction results (correction values) are added (combined). Hereinafter, this known method is referred to as a "known expansion method."

Figure 1:
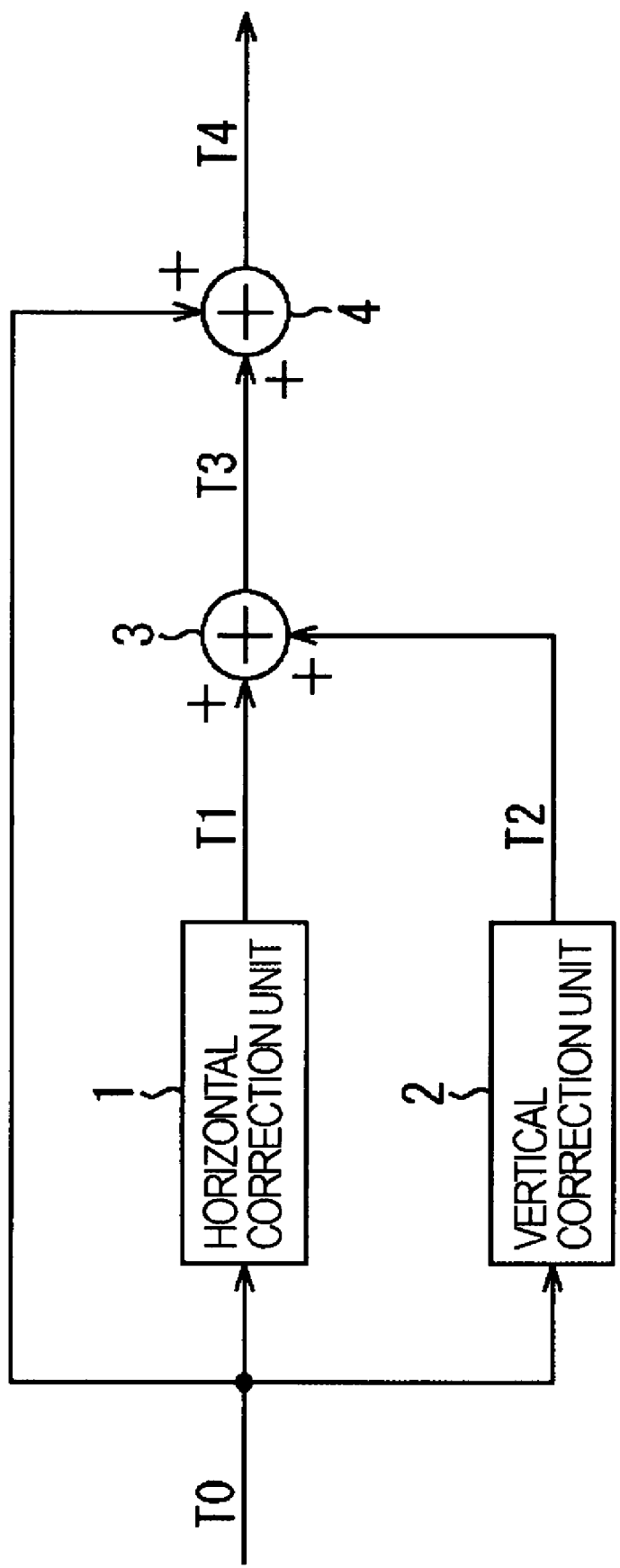
FIG. 1 is a block diagram illustrating the functional structure of a known image processing apparatus.

FIG. 1 illustrates the functional structure of an image processing apparatus employing the known expansion method. Hereinafter, the image processing apparatus illustrated in FIG. 1 is simply referred to as a "known image processing apparatus."

In the descriptions below, the following premise holds.

In other words, it is presumed that the known image processing apparatus carries out various types of image processing on moving image data in access units. An access unit is a unit of a moving image, such as a frame or a field. More specifically, an access unit is, for example, each static image constituting a moving image (such as a frame) or part of the static image (such as a field). To simplify the description below, it is presumed that the known image processing apparatus carries out various types of image processing on moving image data in frame units.

Furthermore, in some cases, the signals input to functional blocks (including calculation units, such as addition units) included in the known image processing apparatus are collectively referred to as "input signals." In other words, in some cases, regardless of the input unit, such as a moving image, a frame included in a moving image, and pixels (pixel values) included in a frame, the signals input to functional blocks are referred to as "input signals." Similarly, in some cases, the signals output from the functional blocks are referred to as "output signals," regardless of the output unit. In other words, when the input unit and the output unit have to be distinguished, their units (mainly, pixel values) are used in the description, whereas, in other cases, "input signals" and "output signals" are simply used.

The above-described premise holds for the various image processing apparatuses according to embodiments of the present invention described blow.

The known image processing apparatus illustrated in FIG. 1 includes a horizontal correction unit 1, a vertical correction unit 2, an addition unit 3, and an addition unit 4.

In the known image processing apparatus, predetermined frame data or part of the frame data is supplied, as input signals T0, to the horizontal correction unit 1, the vertical correction unit 2, and the addition unit 4.

The horizontal correction unit 1 carries out one-dimensional image processing in the horizontal direction on the input signal T0 and supplies an output signal T1 to the addition unit 3. The one-dimensional image processing in the horizontal direction is carried out to determine the horizontal-direction correction value of a target pixel on the basis of the pixel value of the target pixel and the pixel values of other pixels disposed on a horizontal line running through the target pixel.

The vertical correction unit 2 carries out one-dimensional image processing in the vertical direction on the input signal T0 and supplies an output signal T2 to the addition unit 3. The one-dimensional image processing in the vertical direction is carried out to determine the vertical-direction correction value of the target pixel on the basis of the pixel value of the target pixel and the pixel value of other pixels disposed on a vertical line running through the target pixel.

The addition unit 3 adds the output signal T1 from the horizontal correction unit 1 to the output signal T2 from the vertical correction unit 2 and supplies the resulting signal T1+T2 as an output signal T3.

The addition unit 4 adds the output signal T3 of the addition unit 3 to the input signal T0 and supplies the resulting signal T0+T3 as a final output signal T4 to an external unit.

Accordingly, the output signal T1 of the horizontal correction unit 1 is a horizontal-direction correction signal, whereas the output signal T2 of the vertical correction unit 2 is a vertical-direction correction signal. Therefore, the output signal T3 of the addition unit 3 that is a signal obtained by adding the output signals T1 and T2 is added to the input signal T0 as a total correction signal. In other words, when the input signal T0 is constituted of, for example, pixel values (pixel values of pixels included in a frame), the output signal T1 of the horizontal correction unit 1 is constituted of the horizontal-direction correction values of the pixel values, whereas the output signal T2 of the vertical correction unit 2 is constituted of the vertical-direction correction values of the pixel values. Thus, the output signal T3 of the addition unit 3 is constituted of a combined value (i.e., total correction value) of the horizontal-direction correction values and the vertical-direction-correction values of the pixel values.

Next, an example of a result of correction carried out by the known image processing apparatus illustrated in FIG. 1 will be described with reference to FIGS. 2 to 4.

Figure 2:
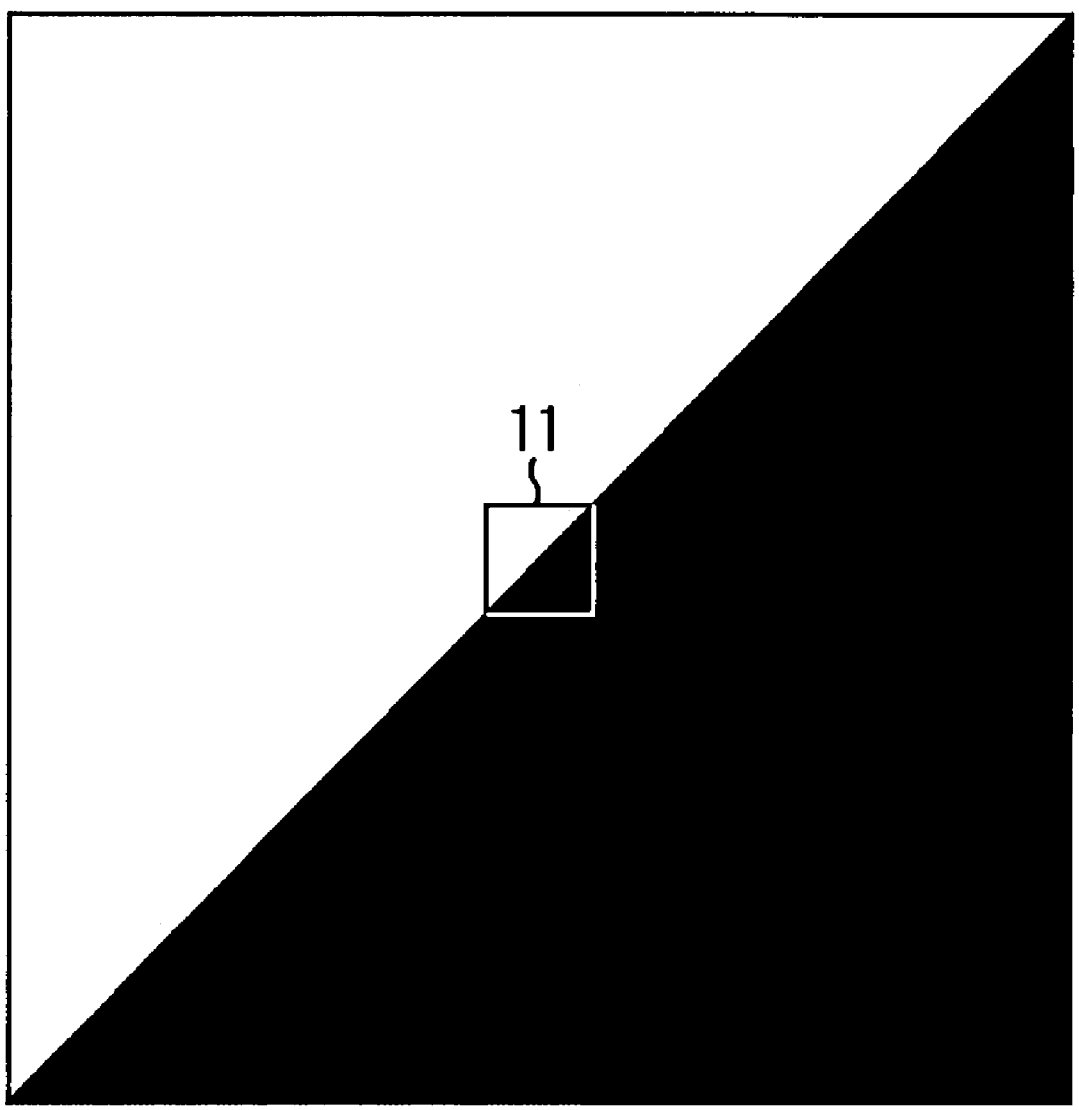
FIG. 2 illustrates a frame on which image processing is to be carried out.
Figure 3:
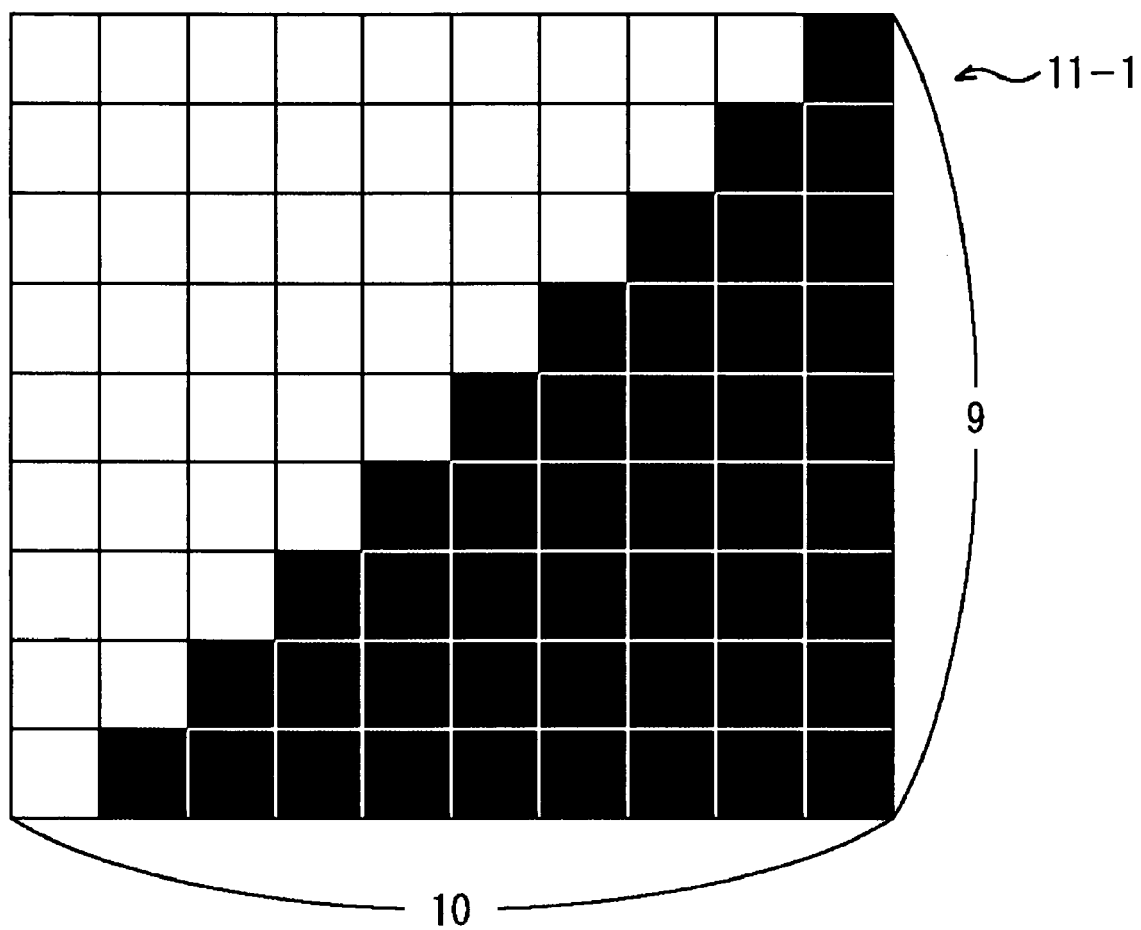
FIG. 3 illustrates a frame on which image processing is to be carried out.

For example, as shown in FIG. 2, an area 11 in the center of a square whose left side of a diagonal line is white and the right side is black is input to the known image processing apparatus as a frame 11-1 having 10 pixels in the horizontal direction and 9 pixels in the vertical direction (hereinafter referred to as "10×9 pixels"), as shown in FIG. 3.

More specifically, the pixels values of the 10×9 pixels in the frame 11-1, as shown in FIG. 3, are input to the known image processing apparatus as an input signal T0, and image processing (correction) is carried out on this input signal T0. However, to simplify the description below, it is postulated that the frame 11-1, shown in FIG. 3, is the input signal T0.

The processing carried out by the horizontal correction unit 1, i.e., one-dimensional image processing in the horizontal direction, is filtering carried out on seven pixels aligned adjacent to each other in the horizontal direction, i.e., horizontal correction by a 7-tap filter. In this case, the areas in the frame 11-1, shown FIG. 3, corrected by the horizontal correction unit 1 are shown as gray areas in a frame 11-2 illustrated in FIG. 4.

The processing carried out by the vertical correction unit 2, i.e., one-dimensional image processing in the vertical direction, is filtering carried out on seven pixels aligned adjacent to each other in the vertical direction, i.e., vertical correction by a 7-tap filter. In this case, the areas in the frame 11-1, shown in FIG. 3, corrected by the vertical correction unit 2 are shown as gray areas in a frame 11-3 illustrated in FIG. 5.

Figure 4:
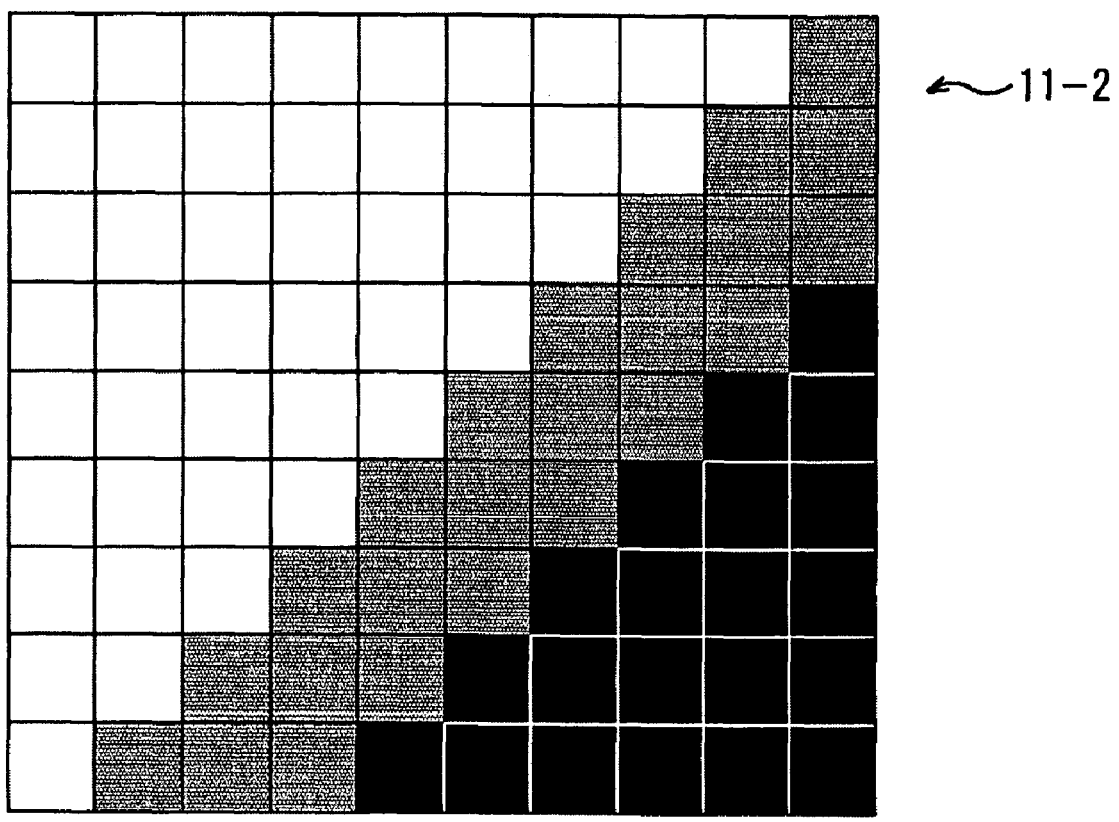
FIG. 4 illustrates an example of the processing results of known one-dimensional image processing carried out on the frame illustrated in FIG. 3 in the horizontal direction.
Figure 5:
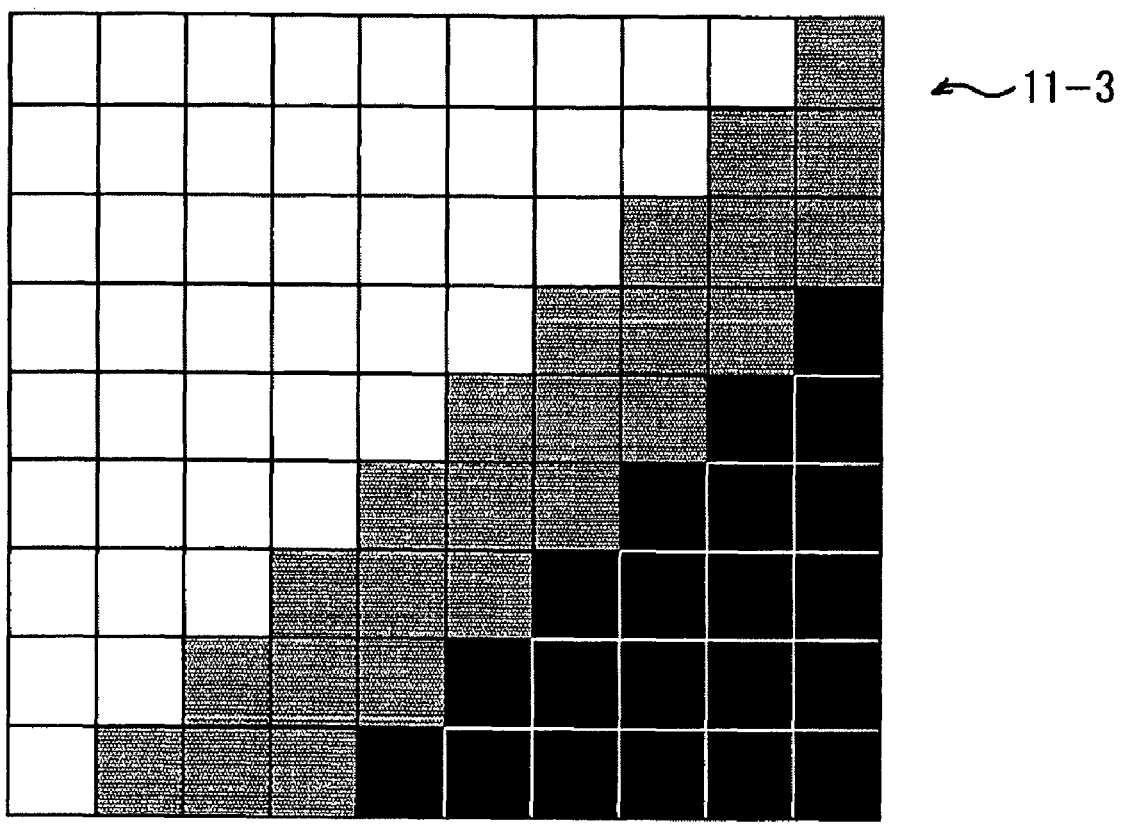
FIG. 5 illustrates an example of the processing results of known one-dimensional image processing carried out on the frame illustrated in FIG. 3 in the vertical direction.

By comparing FIGS. 4 and 5, it can be noticed that the areas in the frame 11-1, shown in FIG. 3, corrected by the horizontal correction unit 1 and the vertical correction unit 2 (i.e., gray areas shown in FIGS. 4 and 5) are the same.

Therefore, as a result, with the known image processing apparatus, correction is carried out only on areas in the frame 11-1, shown in FIG. 3, corresponding to the gray areas shown in FIGS. 4 and 5. The correction values of these areas are equal to the added value (i.e., total correction value) of the horizontal-direction correction values and the vertical-direction correction values. Correction is not carried out on areas in the frame 11-1, shown in FIG. 3, corresponding to areas other than the gray areas shown in FIGS. 4 and 5.

Accordingly, with the known image processing apparatus, the areas in the frame 11-1 shown in FIG. 3, corresponding to the gray areas in FIGS. 4 and 5 are over-corrected and the areas corresponding to the black areas in FIGS. 4 and 5 cannot be processed (i.e., are not corrected). This is a problem that has been described above.

Figure 6:
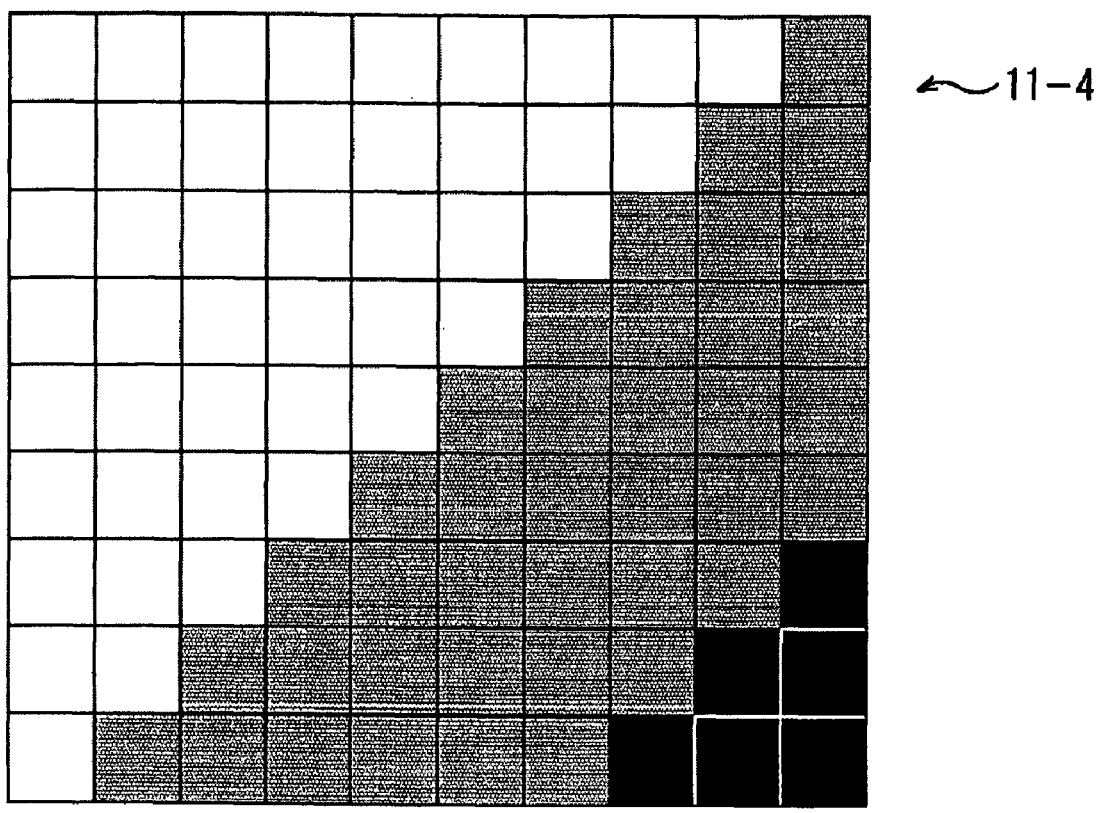
FIG. 6 illustrates an example of the processing results of one-dimensional image processing according to an embodiment of the present invention carried out on the frame illustrated in FIG. 3 in a diagonal direction.

Thus, the inventors carried out a test in which diagonal correction by a 7-tap filter was carried out on the frame 11-1 shown in FIG. 3. In other words, filtering was carried out on seven pixels adjacent to each other in the 45-degree left diagonal direction (i.e., the direction orthogonal to the diagonal line shown in FIG. 2 dividing the frame into black and white areas or the direction of the other diagonal line not shown in FIG. 2). The test result is shown in FIG. 6. The gray areas in a frame 11-4 shown in FIG. 6 are the areas corrected by carrying out diagonal correction, where the black areas are the areas not corrected.

By comparing FIG. 6 and FIGS. 4 and 5, it can be noticed that the corrected area (gray areas) is expanded. In other words, the correction range of the diagonal correction is greater than that of the horizontal and vertical correction.

Accordingly, the inventors invented a new method, described below, of expanding from one-dimensional image processing to two-dimensional image processing. More specifically, the inventors invented an expansion method of combining the correction results of horizontal correction, vertical correction, and predetermined diagonal correction (i.e., correction values in respective directions). Hereinafter, this expansion method is referred to as a "diagonal expansion method."

By employing the diagonal expansion method, the range of unprocessed areas (i.e., uncorrected areas) can be reduced.

However, with the combining process of the diagonal expansion method, if the total correction value (combined correction value) is defined as the sum of the correction values in the horizontal, vertical, and diagonal directions and determined by simply adding these correction values, over-correction occurs in areas corrected in the horizontal, vertical, and diagonal directions (i.e., gray areas in FIG. 6 that are also shown in gray in FIGS. 4 and 5). In other words, if the sum of the correction values in the horizontal, vertical, and diagonal directions is used as the total correction value (combined correction value), over-correction, which is one of the problems identified above, cannot be prevented.

Accordingly, to provide a solution to the problem of over-correction, the inventors invented a new method, described below, as an applied method of the diagonal expansion method. This new method is the same as the above-described diagonal expansion method, up to the point where correction in the horizontal, vertical, and diagonal directions is carried out. In the subsequent steps, as a combining process of combining the results of the correction in the horizontal, vertical, and diagonal directions (i.e., correction values in the horizontal, vertical, and diagonal directions), the inventors have invented a method of individually changing (re-correcting) the correction value in each direction depending on the direction in which correction is to be carried out (hereinafter, referred to as the "correction direction") and adding the changed correction values in the horizontal, vertical, and diagonal directions. Hereinafter, this method is referred to as a "diagonal expansion applied method."

Now, an overview of the processing (in particular, the combining process) carried out by an image processing apparatus (whose structure is described below) employing the diagonal expansion applied method will be described. Hereinafter, the image processing apparatus employing the diagonal expansion applied method is referred to as an "image processing apparatus according to an embodiment of the present invention."

For example, as shown in FIG. 7, a two-dimensional coordinate system corresponding to a frame to be corrected (corresponding to the frame 11-1 in FIG. 3 in the example described above) having a horizontal axis H and a vertical axis V is considered. In this case, the correction direction of a target pixel can be represented by a predetermined vector in the coordinate system. More specifically, for example in FIG. 7, the correction direction is represented by a vector vt1 or vt2. In this case, the length of the vector vt1 or vt2 corresponds to the total correction value of the target pixel.

In this case, for example as shown in FIG. 7, the vector vt1=(a,b) can be resolved into a horizontal vector v1, a 45-degree right diagonal vector v2 (parallel to a line R), and zero vectors in the vertical direction and a left 45-degree diagonal direction (parallel to a line L).

With the image processing apparatus according to an embodiment of the present invention, the horizontal-direction correction value is changed to a value corresponding to the vector v1; the correction value in the 45-degree right diagonal direction is changed to a value corresponding to the vector v2; and the correction values in the vertical and 45-degree left diagonal directions are changed to zero (i.e., values corresponding to zero vectors). Then, after the correction values are changed, the image processing apparatus according to this embodiment adds the correction values for the respective directions. This series of processing is an example of the combining process according to the diagonal expansion applied method and is equivalent to a process of generating the vector vt1 by combining the vectors v1 and v2, as shown in FIG. 7. Therefore, with the image processing apparatus according to this embodiment, the process of adding the result of the series of processing (i.e., the result of the combining process) to the pixel value of the target pixel is equivalent to correction in the correction direction (i.e., direction of the vector vt1) carried out by adding the total correction value (i.e., a value corresponding to the length of the vector vt1) to the pixel value of the target pixel. As a result, the pixel value of the target pixel is adequately corrected. In other words, over-correction is prevented.

Similarly, for example as shown in FIG. 7, the vector vt2=(−a,b) can be resolved into a horizontal vector v3, a 45-degree left diagonal vector v4 (parallel to a line L), and zero vectors in the vertical direction and a 45-degree right diagonal direction (parallel to a line R).

With the image processing apparatus according to an embodiment of the present invention, the horizontal-direction correction value is changed to a value corresponding to the vector v3; the correction value in the 45-degree left diagonal direction is changed to a value corresponding to the vector v4; and the correction values in the vertical and 45-degree right diagonal directions are changed to zero (i.e., values corresponding to zero vectors). Then, after the correction values are changed, the image processing apparatus according to this embodiment adds the correction values for respective directions. This series of processing is an example of the combining process according to the diagonal expansion applied method and is equivalent to a process of generating the vector vt2 by combining the vectors v3 and v4, as shown in FIG. 7. Therefore, with the image processing apparatus according to this embodiment, the process of adding the result of the series of processing (i.e., the result of the combining process) to the pixel value of the target pixel is equivalent to correction carried out in the correction direction (i.e., direction of the vector vt2) by adding the total correction value (i.e., a value corresponding to the length of the vector Vt2) to the pixel value of the target pixel. As a result, the pixel value of the target pixel is adequately corrected. In other words, over-correction is prevented.

In the example shown in FIG. 7, the vector vt1 is resolved into the horizontal vector v1 and the 45-degree right diagonal vector v2 (where other directions are defined as zero vectors). Instead, however, the vector vt1 may be resolved into a vertical vector and a 45-degree right diagonal vector. Similarly, in the example shown in FIG. 7, the vector vt2 is resolved into the horizontal vector v3 and the 45-degree left diagonal vector v4. Instead, however, the vector vt2 may be resolved into a vertical vector and a 45-degree left diagonal vector.

The correction direction is not limited to the direction of the vector vt1 or vt2 and may be any other direction. Regardless of the correction direction, the vector in the correction direction may be resolved into vectors in vectors (including zero vectors) in the horizontal, vertical, 45-degree left diagonal, and 45-degree right diagonal directions.

In summary, the above-described image processing apparatus according this embodiment carries out a series of processing on a target pixel as described below.

First, the image processing apparatus according this embodiment carries out one-dimensional correction in the horizontal, vertical, 45-degree left diagonal, and 45-degree right diagonal directions.

Next, the image processing apparatus according this embodiment carries out the combining process.

The image processing apparatus according this embodiment defines a vector (hereinafter referred to as a "correction index vector") having a length corresponding to the magnitude of an index of the total correction value (hereinafter referred to as a "correction index value") and having a direction corresponding to the correction direction. Then, the image processing apparatus according this embodiment resolves the correction index vector into vectors (including the zero vectors) in the horizontal, vertical, 45-degree left diagonal, and 45-degree right diagonal directions.

Next, the image processing apparatus according this embodiment changes the one-dimensional correction results (correction values) for the horizontal, vertical, 45-degree left diagonal, and 45-degree right diagonal directions in accordance with the vectors in the corresponding direction (when the corresponding vector is a zero vector, the correction value is set to zero).

Finally, the image processing apparatus according this embodiment adds the changed correction values and sets this value as the total correction value.

The above-described series of processing is the combining process.

The image processing apparatus according this embodiment carries out correction of a target pixel by adding the total correction value obtained by the combining process to the pixel value of the target pixel.

FIG. 8 illustrates the functional structure of an image processing apparatus according to another embodiment of the present invention. This image processing apparatus is capable of carrying out the above-described series of processing.

The image processing apparatus according to this embodiment illustrated in FIG. 8 includes a horizontal correction unit 21, a vertical correction unit 22, a left-diagonal correction unit 23, a right-diagonal correction unit 24, a total correction unit 30, and an addition unit 31.

With the image processing apparatus according to this embodiment, a signal T0, similar to that illustrated in FIG. 1, is input to the horizontal correction unit 21, the vertical correction unit 22, the left-diagonal correction unit 23, the right-diagonal correction unit 24, and the addition unit 31.

The horizontal correction unit 21 carries out one-dimensional image processing in the horizontal direction on the input signal T0 and outputs an output signal T1 (which is a signal similar to the output signal T1 of the horizontal correction unit 1 illustrated in FIG. 1) to the total correction unit 30. In other words, the known horizontal correction unit 1 may be used as the horizontal correction unit 21.

The vertical correction unit 22 carries out one-dimensional image processing in the vertical direction on the input signal T0 and outputs an output signal T2 (which is a signal similar to the output signal T2 of the horizontal correction unit 1 illustrated in FIG. 1) to the total correction unit 30. In other words, the known vertical correction unit 2 may be used as the vertical correction unit 22.

The left-diagonal correction unit 23 carries out one-dimensional image processing in the 45-degree left diagonal direction on the input signal T0 and outputs an output signal T3 to the total correction unit 30.

The one-dimensional image processing in the 45-degree left diagonal direction is the processing for determining the correction value in the 45-degree left diagonal direction by using the pixels value of the target pixel and the pixels values of other pixels disposed in the 45-degree left diagonal direction of the target pixel. In other words, when the input signal T0 is constituted of, for example, pixel values (pixels values of the pixels included in a frame), the output signal T3 from the left-diagonal correction unit 23 is a signal constituted of the correction values of the pixel values in the 45-degree left diagonal direction.

The right-diagonal correction unit 24 carries out one-dimensional image processing in the 45-degree right diagonal direction on the input signal T0 and outputs an output signal T4 to the total correction unit 30.

The one-dimensional image processing in the 45-degree right diagonal direction is the processing for determining the correction value in the 45-degree right diagonal direction by using the pixels value of the target value and the pixels values of other pixels disposed in the 45-degree right diagonal direction of the target pixel. In other words, when the input signal T0 is constituted of, for example, pixel values (pixels values of the pixels included in a frame), the output signal T4 from the right-diagonal correction unit 24 is a signal constituted of the correction values of the pixel values in the 45-degree right-diagonal direction.

The total correction unit 30 carries out the combining process, employing the concept of vectors described above with reference to FIG. 7, on the output signal T1 from the horizontal correction unit 21, the output signal T2 from the vertical correction unit 22, the output signal T3 from the left-diagonal correction unit 23, and the output signal T4 from the right-diagonal correction unit 24; generates a total correction signal T5 (which corresponds to the vector vt1 or vt2 in FIG. 7) obtained as a result of the combining process; and outputs the total correction signal T5 to the addition unit 31.

The addition unit 31 adds the total correction signal T5 from the total correction unit 30 to the input signal T0 and outputs the resulting signal T0+T5 as a final output signal T6 to an external unit.

The processing (hereinafter referred to as "correction") carried out by the image processing apparatus according to this embodiment, shown in FIG. 8, will be described again below with reference to the flowchart illustrated in FIG. 9.

In Step S1, the horizontal correction unit 21, the vertical correction unit 22, the left-diagonal correction unit 23, and the right-diagonal correction unit 24 generate correction signals T1, T2, T3, and T4, respectively, in the horizontal, vertical, 45-degree left diagonal, and 45-degree right diagonal directions, respectively, from the original signal (input signal) T0. After the correction signals T1, T2, T3, and T4 are supplied to the total correction unit 30, the process goes to Step S2.

In Step S2, the total correction unit 30 re-corrects the correction signals T1, T2, T3, and T4 by employing the concept of vectors described with reference to FIG. 7.

In Step S3, the total correction unit 30 generates the total correction signal T5 from the re-corrected correction signals T1, T2, T3, and T4.

More specifically, for example, when the correction index vector corresponds to the vector vt1, shown in FIG. 7, a signal obtained by changing the correction signal T1 in accordance with the vector v1 corresponds to the re-corrected correction signal T1 obtained as a result of carrying out Step S2; a signal obtained by changing the correction signal T2 in accordance with the zero vector (i.e., a zero signal) corresponds to the re-corrected correction signal T2 obtained as a result of carrying out Step S2; a signal obtained by changing the correction signal T3 in accordance with the zero vector (i.e., a zero signal) corresponds to the re-corrected correction signal T3 obtained as a result of carrying out Step S2; and a signal obtained by changing the correction signal T4 in accordance with the vector v2 corresponds to the re-corrected correction signal T4 obtained as a result of carrying out Step S2. Therefore, the total correction signal T5 generated in Step S3 corresponds to the vector vt1.

Furthermore, for example, when the correction index vector corresponds to the vector vt2 in FIG. 7, a signal obtained by changing the correction signal T1 in accordance with the vector v3 corresponds to the re-corrected correction signal T1 obtained as a result of carrying out Step S2; a signal obtained by changing the correction signal T2 in accordance with the zero vector (i.e., a zero signal) corresponds to the re-corrected correction signal T2 obtained as a result of carrying out Step S2; a signal obtained by changing the correction signal T3 in accordance with the vector v4 corresponds to the re-corrected correction signal T3 obtained as a result of carrying out Step S2; and a signal obtained by changing the correction signal T2 in accordance with the zero vector (i.e., a zero signal) corresponds to the re-corrected correction signal T4 obtained as a result of carrying out Step S2. Therefore, the total correction signal T5 generated in Step S3 corresponds to the vector vt2.

In this way, Steps S2 and S3 correspond to the combination process according to the above-described diagonal expansion applied method.

Here, to simplify the description, the combining process is entirely carried out at the total correction unit 30. However, as described below with reference to FIG. 10, part of the combining process may be carried out at the correction units (i.e., the horizontal correction unit 21, the vertical correction unit 22, the left-diagonal correction unit 23, and the right-diagonal correction unit 24).

When the total correction signal T5 is supplied to the addition unit 31, the process goes to Step S4. In Step S4, the addition unit 31 outputs a signal T0+T5 obtaining by adding the total correction signal T5 and the original signal (input signal) T0 as a final output signal T6 to an external unit. Then, the process is completed.

The correction carried out by the image processing apparatus according to this embodiment, shown in FIG. 8, has been described above.

The image processing apparatus according to this embodiment shown in FIG. 8 may be employed as, for example, an image processing apparatus according to Japanese Patent Application No. 2004-354571 already filed by the inventors, i.e., an image processing apparatus capable of carrying out correction with a correction value corresponding to the magnitude (length) of a movement vector so as to suppress blurriness during image capturing.

In such a case, by using the movement vector as a correction index vector, the image processing apparatus according to an embodiment of the present invention may be configured as shown in FIG. 10.

In FIG. 10, components that correspond to those in FIG. 8 are represented by the same reference numerals, and, descriptions thereof are not repeated.

The image processing apparatus according to this embodiment shown in FIG. 10 includes a resolution unit 29 and a movement-vector detection unit 32 that are not included in FIG. 8. Moreover, instead of the total correction unit 30 included in FIG. 8, a total correction unit 35 is provided. In other words, as described in detail below, part of the above-described combining process (Step S2 in the process shown in FIG. 9) is carried out by the units 21 to 24 shown in FIG. 10 and the total correction unit 35 carries out only Step S3.

The movement-vector detection unit 32 included in the image processing apparatus according to this embodiment shown in FIG. 10 detects a horizontal-direction movement vector and a vertical-direction movement vector of each pixel included in a predetermined frame that corresponds to the input signal T0 on the basis of the predetermined frame and several frames adjacent to the predetermined frame. Then, the movement-vector detection unit 32 supplies signals MV_H (hereinafter simply referred to as "MV_H") corresponding to the horizontal-direction movement vectors of the pixels included in the predetermined frame and signals MV_V (hereinafter simply referred to as "MV_V") corresponding to vertical-direction movement vectors of the pixels included in the predetermined frame to a resolution unit 29.

The resolution unit 29 sets a combined vector (i.e., movement vector) of a pixel by combining a horizontal-direction movement vector of an MV_H and a vertical-direction movement vector of an MV_V as a correction index vector of the pixel. Then, the resolution unit 29 resolves the correction index vector of the pixel into vectors in the horizontal, vertical, 45-degree left diagonal, and 45-degree right diagonal directions. The resolution unit 29 supplies a signal constituted of the horizontal vector of the pixel to the horizontal correction unit 21 as a movement vector signal MV0 (hereinafter simply referred to as MV0), supplies a signal constituted of the vertical vector of the pixel to the vertical correction unit 22 as a movement vector signal MV1 (hereinafter simply referred to as MV1), supplies a signal constituted of the 45-degree left diagonal vector of the pixel to the left-diagonal correction unit 23 as a movement vector signal MV2 (hereinafter simply referred to as MV2), and supplies a signal constituted of the 45-degree right diagonal vector of the pixel to the right-diagonal correction unit 24 as a movement vector signal MV3 (hereinafter simply referred to as MV3).

Hereinafter, when processing carried out on the target pixel is described, the horizontal-direction movement vector of the target pixel is referred to as an MV_H, and the vertical-direction movement vector of the target pixel is referred to as an MV_V. Furthermore, the movement vector of the target pixel provided to the horizontal correction unit 21 is referred to as an MV0; the movement vector of the target pixel provided to the vertical correction unit 22 a is referred to as an MV1; the movement vector of the target pixel provided to the left-diagonal correction unit 23 is referred to as an MV2; and the movement vector of the target pixel provided to the right-diagonal correction unit 24 is referred to as MV3.

More specifically, for the apparatus shown in FIG. 10, the correction index vector of the target pixel (i.e., a movement vector that is a combined vector of an MV_H and an MV_V) is resolved into a horizontal vector, a vertical vector, a 45-degree light diagonal vector, and a 45-degree right diagonal vector. Among these vectors, the horizontal vector is supplied to the horizontal correction unit 21 as an MV; the vertical vector is supplied to the vertical correction unit 22 as an MV1; the 45-degree left diagonal vector is supplied to the left-diagonal correction unit 23 as an MV2; and the 45-degree right diagonal vector is supplied to the right-diagonal correction unit 24 as an MV3.

For example, for each direction, a first direction is defined as a positive (+) direction and a second direction in the opposite direction of the first direction is defined as a negative (−) direction. More specifically, for example in FIG. 7, for the horizontal direction H, the rightward direction in the drawing is defined as the positive (+) direction of the horizontal direction H, whereas the leftward direction in the drawing is defined as the negative (−) direction of the horizontal direction H; for the vertical direction V, the upward direction in the drawing is defined as the positive (+) direction of the vertical direction V, whereas the downward direction in the drawing is defined as the negative (−) direction of the vertical direction V; for the 45-degree left direction (the direction of the line L), the upward direction in the drawing is defined as the positive (+) direction of the 45-degree left direction, whereas the downward direction in the drawing is defined as the negative (−) direction of the 45-degree left direction; and for the 45-degree right direction (the direction of the line R), the upward direction in the drawing is defined as the positive (+) direction of the 45-degree right direction, whereas the downward direction in the drawing is defined as the negative (−) direction of the 45-degree right direction.

In this case, the MV_H, MV_V, MV0, MV1, MV2, and MV3 can be represented as +k or −k (where k represents an arbitrary integer value representing the magnitude of the vector).

The processing carried out on the target pixel by the resolution unit 29 will be described on the basis of the above-described presupposition.

As described above, the apparatus shown in FIG. 10 employs the combined vector, i.e., a movement vector, of an MV_H and an MV_V as a correction index vector. Therefore, for example, when MV_H=+a and MV_V=+b, the correction index vector (i.e., movement vector) is equal to the vector vt1 shown in FIG. 7. For example, when MV_H=−a and MV_V=+b, correction index vector is equal to the vector vt2. To simplify the description, it is presumed that the movement vector is equal to the vector vt1 or vt2 shown in FIG. 7. In other words, in the description below, the magnitude of the MV_H is a, and the magnitude of the MV_V is b.

In this case, the resolution unit 29 resolves the correction index vector into vectors in the horizontal, vertical, 45-degree left diagonal, and 45-degree right diagonal directions. Among these vectors, the horizontal vector and the vertical vector are generated (by resolution) as described below. The resolution unit 29 generates a vector having a magnitude of [max(a,b)−min(a,b)] as a vector corresponding to the horizontal or vertical direction, whichever has a greater magnitude (a or b) (in other words, if a is greater, a vector in the horizontal direction is generated, whereas if b is greater, a vector in the vertical direction is generated). Here, max( ) represents a function outputting a maximum value, and min( ) represents a function outputting a minimum value. In this case, the resolution unit 29 generates zero vectors for the other directions.

More specifically, when a is greater (i.e., the case shown in FIG. 7), a horizontal vector having a magnitude of a−b is generated and is supplied to the horizontal correction unit 21 as an MV0. In this case, the vertical vector is a zero vector and is supplied to the vertical correction unit 22 as an MV1.

In contrast, when b is greater (i.e., the case not shown in FIG. 7), a vertical vector having a magnitude of b−a is generated and is supplied to the vertical correction unit 22 as an MV1. In this case, the horizontal vector is a zero vector and is supplied to the horizontal correction unit 21 as an MV0.

The resolution unit 29 resolves the correction index vector into vectors in the horizontal, vertical, 45-degree left diagonal, and 45-degree right diagonal directions. Among these vectors, the 45-degree left diagonal vector and the 45-degree right diagonal vector are generated (by resolution) as described below. The resolution unit 29 generates a 45-degree right diagonal vector having a magnitude of min(a,b) when the signs of the MV_H and the MV_V are the same (i.e., when the vector vt1 is set as the movement vector in FIG. 7) and supplies the generated vector to the right-diagonal correction unit 24 as an MV3. In this case, the resolution unit 29 sets the 45-degree left diagonal vector as a zero vector (i.e., generates a zero vector) and supplies the zero vector to the left-diagonal correction unit 23 as an MV2.

In contrast, the resolution unit 29 generates a 45-degree left diagonal vector having a magnitude of min(a,b) when the signs of the MV_H and the MV_V are the different (i.e., when the vector vt2 is set as the movement vector in FIG. 7) and supplies the generated vector to left-diagonal correction unit 23 as an MV2. In this case, the resolution unit 29 sets the 45-degree right diagonal vector as a zero vector (i.e., generates a zero vector) and supplies the zero vector to the right-diagonal correction unit 24 as an MV3.

In this way, the correction index vector (movement vector) is resolved into vectors in the horizontal, vertical, 45-degree left diagonal, and 45-degree right diagonal directions. The vectors obtained as a result of the resolution are supplied to the horizontal correction unit 21, the vertical correction unit 22, left-diagonal correction unit 23, and the right-diagonal correction unit 24 as MV0, MV1, MV2, and MV3 (including zero vectors), respectively.

Accordingly, the horizontal correction unit 21 carries out one-dimensional image processing in the horizontal direction on the input signal (original signal) T0 according to the MV0 and supplies a resulting output signal T11 to the total correction unit 35.

Similarly, the vertical correction unit 22 carries out one-dimensional image processing in the vertical direction on the input signal (original signal) T0 according to the MV1 and supplies a resulting output signal T12 to the total correction unit 35.

The left-diagonal correction unit 23 carries out one-dimensional image processing in the 45-degree left diagonal direction on the input signal (original signal) T0 according to the MV2 and supplies a resulting output signal T13 to the total correction unit 35.

The right-diagonal correction unit 24 carries out one-dimensional image processing in the 45-degree right diagonal direction on the input signal (original signal) T0 according to the MV3 and supplies a resulting output signal T14 to the total correction unit 35.

In this case, as described above, the MV, MV1, MV2, and MV3 (including the zero vectors) are vectors generated on the basis of the concept of vectors described with reference to FIG. 7 (i.e., vectors generated by resolving the correction index vector in the horizontal, vertical, 45-degree left diagonal, and 45-degree right diagonal directions). Therefore, an output signal T11 from the horizontal correction unit 21, an output signal T12 from the vertical correction unit 22, an output signal T13 from the left-diagonal correction unit 23, and an output signal T14 from the right-diagonal correction unit 24 are signals obtained as a result of carrying out Steps S2 in the process illustrated in FIG. 8 (i.e., correction signals of the respective directions obtained after re-correction). In other words, the MV0, MV1, MV2, and MV3 are signals corresponding to vectors in the horizontal, vertical, 45-degree left diagonal, and 45-degree right diagonal directions. In this way, with the apparatus shown in FIG. 10, the units 21 to 24 carry out Steps S1 and S2 in the process illustrated in FIG. 9.

Therefore, as described above, the total correction unit 35 carries out only Step S3 of the process. In other words, in Step S3, the total correction unit 35 supplies an signal T11+T12+ T13+T14, obtained by adding the signals T11, T12, T13, and T14, to the addition unit 31. Then, in Step S4, the addition unit 31 outputs a signal T0+T5 obtained by adding the total correction signal T5 and the original signal (input signal) T to an external unit as an output signal T6.

The processing carried out by the units 21 to 24, shown in FIG. 10 is not limited to one-dimensional image processing in the respective directions (horizontal, vertical, 45-degree left diagonal, and 45-degree right diagonal directions) according to the movement vectors (MV0, MV1, MV2, and MV3), and instead, for example, the processing described below may be employed.

For example, the following processing may be carried out. In a first step of the processing, predetermined one-dimensional image processing (for example, filtering) is carried out on an input signal. In a second step of the processing, another processing using a movement vector (for example, processing for changing the gain when the gain is equal to the magnitude of the movement vector) is carried out on the signal obtained in the first step.

When this process is matched with the process illustrated in FIG. 9, the first step corresponds to Step S1 and the second step corresponds to Step S2. More specifically, for example, the first one-dimensional image processing carried out by the horizontal correction unit 21 is a process described below. In Step S1, the horizontal correction unit 21 carries out one-dimensional image processing in the horizontal direction on an input signal (original signal) T0 and generates a correction signal T1 similar to the output signal T1 of the horizontal correction unit 21 shown in FIG. 8. Then, in Step S2, the horizontal correction unit 21 re-corrects the correction signal T0 in accordance with an MV0 from the resolution unit 29 and supplies a resulting output signal T11 to the total correction unit 35. Since the processing carried out by the units 22 to 24 is basically the same, description thereof is omitted here.

Another processing to be carried out by the units 21 to 24 shown in FIG. 10, for example, may only require a first step. However, it is possible to employ processing in which various conditions that are required for carrying out the first step of the processing in accordance with the movement vector are variably set (for example, the number of taps in accordance with the magnitude of the movement vector are variably set), and one-dimensional image processing (for example, filtering) is carried out on an input signal in accordance with the various conditions set according to the movement vector.

In this way, the image processing apparatus, shown in FIG. 10, according to this embodiment of the present invention may carry out correction using a movement vector as a correction index vector. Furthermore, an image processing apparatus according to another embodiment of the present invention that is capable of carrying out correction by using a movement vector as a correction index vector is illustrated in FIG. 11. FIG. 11 illustrates an image processing apparatus according to another embodiment of the present invention and is different from the image processing apparatus described above.

In FIG. 11, components that correspond to those in FIG. 10 are represented by the same reference numerals, and, descriptions thereof are not repeated.

The image processing apparatus according to this embodiment shown in FIG. 11 includes a MAX output unit 41 that is not included in FIG. 10. Moreover, instead of the total correction unit 35 included in FIG. 8, a total correction unit 42 is provided. Details of the total correction unit 42 are described below with reference to FIG. 12. Other structures are the same as those of the apparatus illustrated in FIG. 10.

The movement-vector detection unit 32 supplies MV_H to the MAX output unit 41, the horizontal correction unit 21, and the total correction unit 42 while supplying MV_V to the MAX output unit 41, the vertical correction unit 22, and the total correction unit 42.

The MAX output unit 41 supplies whichever is greater of the MV_V and MV_H to the left-diagonal correction unit 23 and the right-diagonal correction unit 24.

To simplify the description with reference to FIG. 11, it is presumed that the magnitude of the MV_H is a, and the magnitude of the MV_V is b. In this case, when a is greater, the MV_H is output from the MAX output unit 41 and input to the left-diagonal correction unit 23 and the right-diagonal correction unit 24. In contrast, when b is greater, the MV_V is output from the MAX output unit 41 and is input to the left-diagonal correction unit 23 and the right-diagonal correction unit 24.

In other words, with the apparatus illustrated in FIG. 11, the MV_H is supplied to the horizontal correction unit 21 as an MV0, and the MV_V is supplied to the vertical correction unit 22 as an MV1. The output (i.e., MV_H or MV_V) from the MAX output unit 41 is supplied to the vertical correction unit 22 as an MV2 and supplied to the right-diagonal correction unit 24 as an MV3.

The horizontal correction unit 21 carries out one-dimensional image processing in the horizontal direction on the input signal (original signal) T0 according to the MV0 and supplies a resulting output signal T21 to the total correction unit 42.

Similarly, the vertical correction unit 22 carries out one-dimensional image processing in the vertical direction on the input signal (original signal) T0 according to the MV1 and supplies a resulting output signal T22 to the total correction unit 42.

The left-diagonal correction unit 23 carries out one-dimensional image processing in the 45-degree left diagonal direction on the input signal (original signal) T0 according to the MV2 and supplies a resulting output signal T23 to the total correction unit 42.

The right-diagonal correction unit 24 carries out one-dimensional image processing in the 45-degree right diagonal direction on the input signal (original signal) T0 according to the MV3 and supplies a resulting output signal T24 to the total correction unit 42.

With the apparatus shown in FIG. 10, the MV0, MV1, MV2, and MV3 are vectors (including zero vectors) obtained by resolving the movement vector (correction index vector) obtained by combining the MV_H and the MV_V into vectors in the horizontal, vertical, 45-degree left diagonal, and 45-degree right diagonal directions. Therefore, the output signals T11 to T14 of the units 21 to 24, respectively, are signals obtained by resolving the movement vector into vectors in the respective directions. With the apparatus shown in FIG. 10, the output signals T11 to T14 from the units 21 to 24, respectively, are signals obtained as a result of carrying out Step S2 in the process illustrated in FIG. 9.

In contrast, with the apparatus shown in FIG. 11, each of the MV0, MV1, MV2, and MV3 is an MV_H or an MV_V. Therefore, the output signals T21 to T24 of the units 21 to 24, respectively, are signals of vectors that have not been resolved. With the apparatus shown in FIG. 11, the output signals T21 to T24 from the units 21 to 24, respectively, are signals obtained as a result of carrying out Step S1 of the process illustrated in FIG. 9 (or signals obtained midway of Steps S2).

In other words, with the apparatus shown in FIG. 10, the correction values for the respective directions represented by the output signals T11 to T14 from the units 21 to 24, respectively, supplied to the total correction unit 35 already correspond to the magnitude of the vectors obtained by resolving the correction index vector into vectors in the respective directions. Therefore, the total correction unit 35 is capable of directly employing the total sum signal obtained by adding the output signals T11 to T14 of the units 21 to 24, respectively, as a total correction signal T5. In other words, the total correction unit 35 only needs to carry out Step S3 in the process illustrated in FIG. 9.

In contrast, with the apparatus shown in FIG. 11, the correction values of the respective directions represented by the output signals T21 to T24 of the units 21 to 24, respectively, supplied to the total correction unit 42 correspond to the magnitude of the MV_H or the MV_V and do not correspond to the magnitude of the vectors obtained by resolving the correction index vector into vectors in the respective directions. Therefore, the total correction unit 35 cannot simply set the total correction signal T5 to the total sum signal obtained by adding the output signals T21 to T24 of the units 21 to 24, respectively. More specifically, the total correction unit 42 should carry out at least part of Step S2 of the process illustrated in FIG. 9, then change the correction values represented by the output signals T21 to T24 from the units 21 to 24, respectively, into values corresponding to the magnitudes of the vectors obtained by resolving the correction index vector into vectors in the respective directions, and finally, after the changing the correction values, carry out Step S3 of the process (i.e., add the correction values in the respective directions after the correction values are changed).

Figure 12:
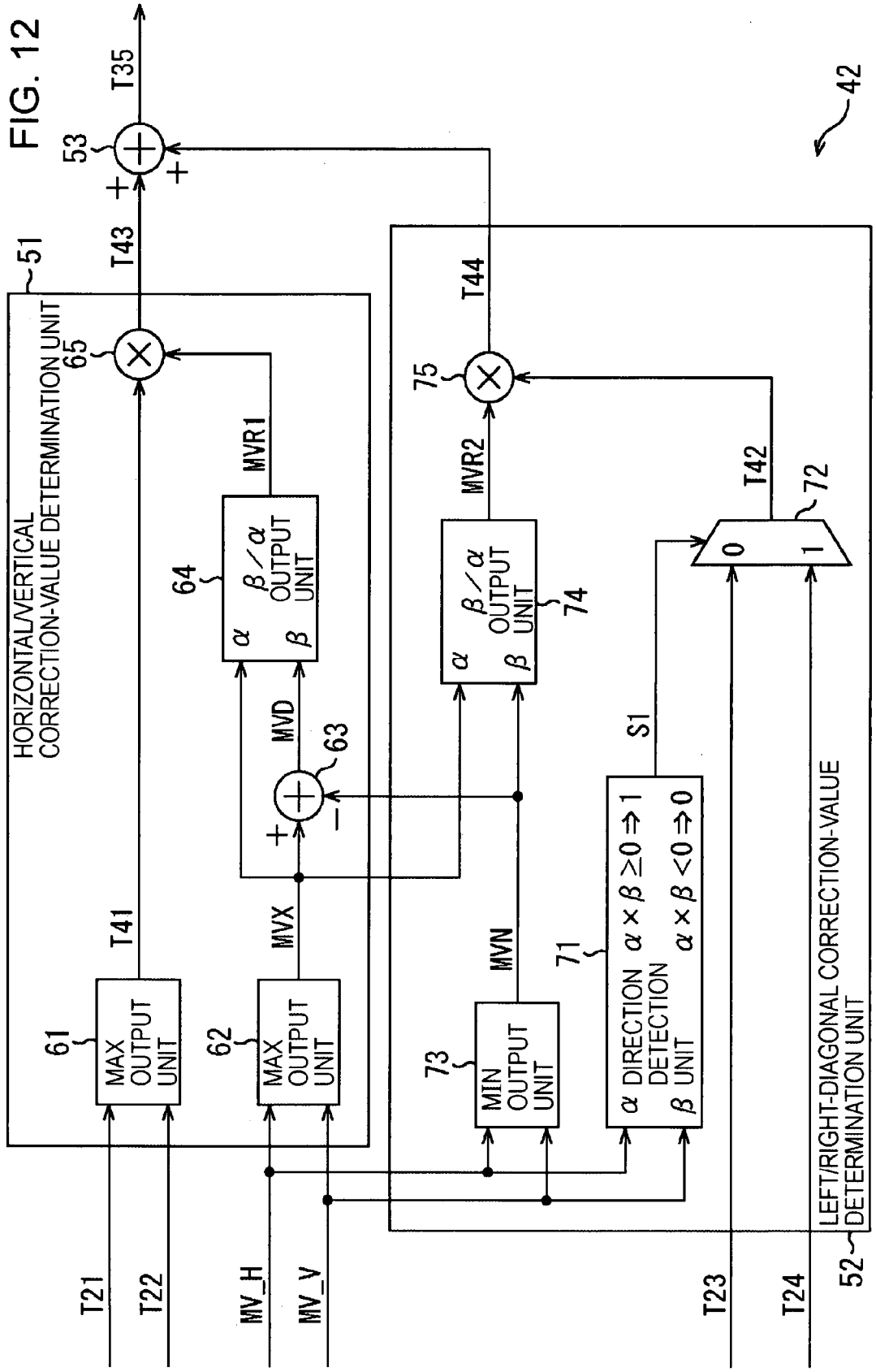
FIG. 12 is a block diagram illustrating the details of the functional structure of an overall correction unit of the image processing illustrated in FIG. 11.

Therefore, for example, the total correction unit 42 included in the image processing apparatus shown in FIG. 12 includes a horizontal/vertical correction-value determination unit 51, a left/right-diagonal correction-value determination unit 52, and an addition unit 53.

To make it easier to understand the apparatus shown in FIG. 12 in relation to the vectors shown in FIG. 7, it is presumed that the magnitude of the MV_H is a, and the magnitude of the MV_V is b.

The horizontal/vertical correction-value determination unit 51 generates, from a signal T21 or T22, a signal T43 corresponding to a movement vector in the horizontal or vertical direction (i.e., a vector in the horizontal or vertical direction obtained by resolving a movement vector, which is obtained by combining the MV_H and the MV_V) and supplies the signal T43 to the addition unit 53.

Therefore, the left/right-diagonal correction-value determination unit 52 includes a MAX output unit 61, a MAX output unit 62, a subtraction unit 63, a β/α output unit 64, and a multiplication unit 65.

The MAX output unit 61 outputs whichever is greater of the signal T21 or T22 to the multiplication unit 65 as an output signal T41. The signal T21 is a horizontal-direction correction signal generated by the horizontal correction unit 21 according to the MV0 (which is the MV_H having a magnitude a), as shown in FIG. 11, and the signal T22 is a vertical-direction correction signal generated by the vertical correction unit 22 according to the MV1 (which is the MV_V having a magnitude b). Therefore, as described above, when a is greater than b (i.e., the case illustrated in FIG. 7), the movement vector is resolved into a vector in the horizontal direction (where the vector in the vertical direction is a zero vector) and a horizontal-direction correction signal is used (where the vertical-direction correction signal is a zero signal). Accordingly, the signal T21 is supplied to the multiplication unit 65 as a signal T41. In contrast, as described above, when b is greater than a, the movement vector is resolved into a vector in the vertical direction (where the vector in the horizontal direction is a zero vector) and a vertical-direction correction signal is used (where the horizontal-direction correction signal is a zero signal). Accordingly, the signal T22 is supplied to the multiplication unit 65 as a signal T41.

When the movement vector is resolved into a vector in the horizontal direction (i.e., when a>b), the magnitude of the horizontal vector (for example, vector v3 or v1 in FIG. 7) is a−b. Therefore, the scalar ratio of the magnitude a−b of the horizontal vector to the magnitude a of the MV_0 (=MV_V) shown in FIG. 11 is (a−b)/a. In contrast, when the movement vector is resolved into a vector in the vertical direction (i.e., when b>a), the magnitude of the vertical vector is b−a. Therefore, the scalar ratio of the magnitude b−a of the vertical vector to the magnitude b of the MV1 (=MV_V) shown in FIG. 11 is (b−a)/b. When both of these are combined, the scalar ratio can be represented as [max(a,b)−min(a,b)]/max (a,b)]. The block that computes the scalar ratio is the block including the units 62 to 64 (and a MIN output unit 73 described below).

More specifically, the MAX output unit 62 supplies an output signal MVX, corresponding to whichever is greater of the MV_H (with a magnitude a) or MV_V (with a magnitude b), to the subtraction unit 63 and the β/α output unit 64 (and a β/α output unit 74 described below). In other words, the output signal MVX from the MAX output unit 62 corresponds to max(a,b).

The subtraction unit 63 supplies an output signal MVD obtained by subtracting an output signal MVN of the MIN output unit 73 from the output signal MVX of the MAX output unit 62 to the β/α output unit 64. As described above, the output signal MVX corresponds to max(a,b), and, as described below, the output signal MVN corresponds to min (a,b). Therefore, the output signal MVD from the subtraction unit 63 corresponds to [max(a,b)−min(a,b)].

The β/α output unit 64 supplies an output signal MVR1 obtained by dividing the output signal MVD of the subtraction unit 63 by the output signal MVX of the MAX output unit 62 to the multiplication unit 65. The output signal MVR1 from the β/α output unit 64 corresponds to [max(a,b)−min(a, b)]/max(a,b)], i.e., corresponds to the above-described scalar ratio.

The multiplication unit 65 supplies an output signal T43 obtained by multiplying the output signal T41 of the MAX output unit 61 with the output signal MVR1 of the β/α output unit 64 to the addition unit 53. When the output signal T43 from the multiplication unit 65 corresponds to a vector in the horizontal or vertical direction or, more specifically, for example, when the movement vector is the correction index vector vt1 or vt2, shown in FIG. 7, the output signal T43 corresponds to the horizontal vector v1 or v3.

In this way, the output signal T43 of the multiplication unit 65 is supplied to the addition unit 53 as a re-corrected horizontal-direction correction signal or a re-corrected vertical-direction correction signal.

Similar to the horizontal/vertical correction-value determination unit 51, the left/right-diagonal correction-value determination unit 52 generates a signal T44 that corresponds to a vector in the 45-degree left diagonal direction or the 45-degree right diagonal direction (i.e., a vector that is obtained by resolving the movement vector, combining the MV_H and the MV_V, into a vector in the 45-degree left diagonal or the 45-degree right diagonal direction) and supplies the signal T44 to the addition unit 53.

Therefore, the left/right-diagonal correction-value determination unit 52 includes a direction detection unit 71, a selecting unit 72, a MIN output unit 73, a β/α output unit 74, and a multiplication unit 75.

When the product of MV_H (input as α) and MV_V (input as β) is equal to zero or greater, the direction detection unit 71 supplies an output signal S1 corresponding to "1" to the selecting unit 72. When the product of the MV_H (input as α) and the MV_V (input as β) is smaller than zero, the direction detection unit 71 supplies a output signal S1 corresponding to "0" to the selecting unit 72.

When the output signal S1 from the direction detection unit 71 corresponds to "0," the selecting unit 72 outputs a signal T23 to the multiplication unit 75 as an output signal T42. When the output signal S1 from the direction detection unit 71 corresponds to "1," the selecting unit 72 outputs the signal T24 to the multiplication unit 75 as an output signal T42.

If the output signal S1 output from the direction detection unit 71 corresponds to "1," the product of the MV_H and the MV_V is zero or greater, i.e., the MV_H and the MV_V are both the same sign. As described above, when the MV_H and the MV_V are both the same sign, the movement vector is resolved into a vector in the 45-degree right diagonal direction (where the vector in the 45-degree left diagonal direction is a zero vector). Therefore, since a right-diagonal-direction correction signal is used (the left-diagonal-direction correction signal is a zero signal), the output signal T24 of the right-diagonal correction unit 24, shown in FIG. 11, is supplied to the multiplication unit 75 as an signal T42.

In contrast, if the output signal S1 from the direction detection unit 71 corresponds to "0," the product of the MV_H and the MV_V is smaller than zero, i.e., the MV_H and the MV_V are different signs. As described above, when the MV_H and the MV_V are different signs, the movement vector is resolved into a vector in the 45-degree left diagonal direction (where the vector in the 45-degree right diagonal direction is a zero vector). Therefore, since a left-diagonal-direction correction signal is used (the right-diagonal-direction correction signal is a zero signal), the output signal T23 of the left-diagonal correction unit 23, shown in FIG. 11, is supplied to the multiplication unit 75 as the signal T42.

In this case, the signal T23 or T24 is a right-diagonal-direction correction signal or a left-diagonal-direction correction signal, respectively, and are generated at the left-diagonal correction unit 23 or the right-diagonal correction unit 24, respectively, according to the MV2 or MV3, respectively, shown in FIG. 11. The magnitude of each of the MV2 and MV3 is max(a,b). As described above, the magnitude of the left-diagonal-direction correction signal or the right-diagonal-direction correction signal obtained by resolving the movement vector (vector v4 or v2 in FIG. 7) is min(a,b). Therefore, the scalar ratio of the vector in the 45-degree left diagonal or the 45-degree right diagonal direction (vector v4 or v2 in FIG. 7) to either the MV2 or MV3 is min(a,b)/max (a,b). The block that computes the scalar ratio is the block including the selecting unit 72 and the β/α output unit 74 (and the MAX output unit 62 described above).

More specifically, the MIN output unit 73 supplies whichever is smaller of the signal MV_H (with a magnitude a) and the signal MV_V (with a magnitude b) to the subtraction unit 63 and the β/α output unit 74 as the output signals MVN. The output signals MVN from the MIN output unit 73 correspond to min(a,b).

The β/α output unit 74 supplies an output signal MVR2 obtained by diving the output signal MVN of the MIN output unit 73 with the output signal MVX of the MAX output unit 62 to the multiplication unit 75. The output signal MVR2 from the β/α output unit 74 corresponds to min(a,b)/max(a, b), i.e., corresponds to the above-described scalar ratio.

The multiplication unit 75 supplies an output signal T44 obtained by multiplying the output signal T42 of the selecting unit 72 with the output signal MVR2 of the β/α output unit 74 to the addition unit 53. When the output signal T44 from the multiplication unit 75 corresponds to a vector in the 45-degree left diagonal or the 45-degree right diagonal direction or, more specifically, for example, when the movement vector is the correction index vector vt1 in FIG. 7, the output signal T44 corresponds to the vector v2 in the 45-degree right diagonal direction, whereas when the movement vector is the correction index vector vt2 in FIG. 7, the output signal T44 corresponds to the vector v4 in the 45-degree left diagonal direction.

In this way, the output signal T44 from the multiplication unit 75 is supplied to the addition unit 53 as a right-diagonal-direction correction signal or a left-diagonal-direction correction signal.

The addition unit 53 supplies an output signal T35 obtained by adding the output signal T43 of the horizontal/vertical correction-value determination unit 51 (i.e., horizontal- or vertical-direction correction signal T43) and the output signal T44 of the left/right-diagonal correction-value determination unit 52 (i.e., left- or right-diagonal-correction signal T44) to the addition unit 31, shown in FIG. 11. The addition unit 53 generates the output signal T35 that is a total correction signal by carrying out processing equivalent to combining a vector in the horizontal or vertical direction and a vector in the 45-degree left diagonal or 45-degree right diagonal direction.

As shown in FIG. 11, the signal T35 is supplied to the addition unit 31 as an output signal of the total correction unit 42, i.e., a total correction signal. The addition unit 31 adds the total correction signal T35, which is the output signal from the total correction unit 42, to the input signal T0 and outputs the resulting signal T0+T35 as a final output signal T36.

As described above, the image processing apparatus according to this embodiment, shown in FIG. 11, is also capable of carrying out correction in accordance with the flowchart illustrated in FIG. 9. However, Step S2 is carried out by the horizontal/vertical correction-value determination unit 51 and the left/right-diagonal correction-value determination unit 52 of the total correction unit 42, shown in FIG. 12. Step S3 is carried out by the addition unit 53 of the total correction unit 42, shown in FIG. 12.

The one-dimensional image processing in the respective directions (i.e., processing carrying out by the units 21 to 24 shown in FIG. 11) is not limited to the above-described processing. Instead, for example, enhancement may be employed.

However, in general, an enhanced signal is affected by noise. Thus, to prevent the effect of noise without reducing the effect of enhancement, there is a known method of providing a band limitation on the enhancement result in a direction orthogonal to the direction of enhancement (hereinafter referred to as a "band limitation method").

Figure 13:
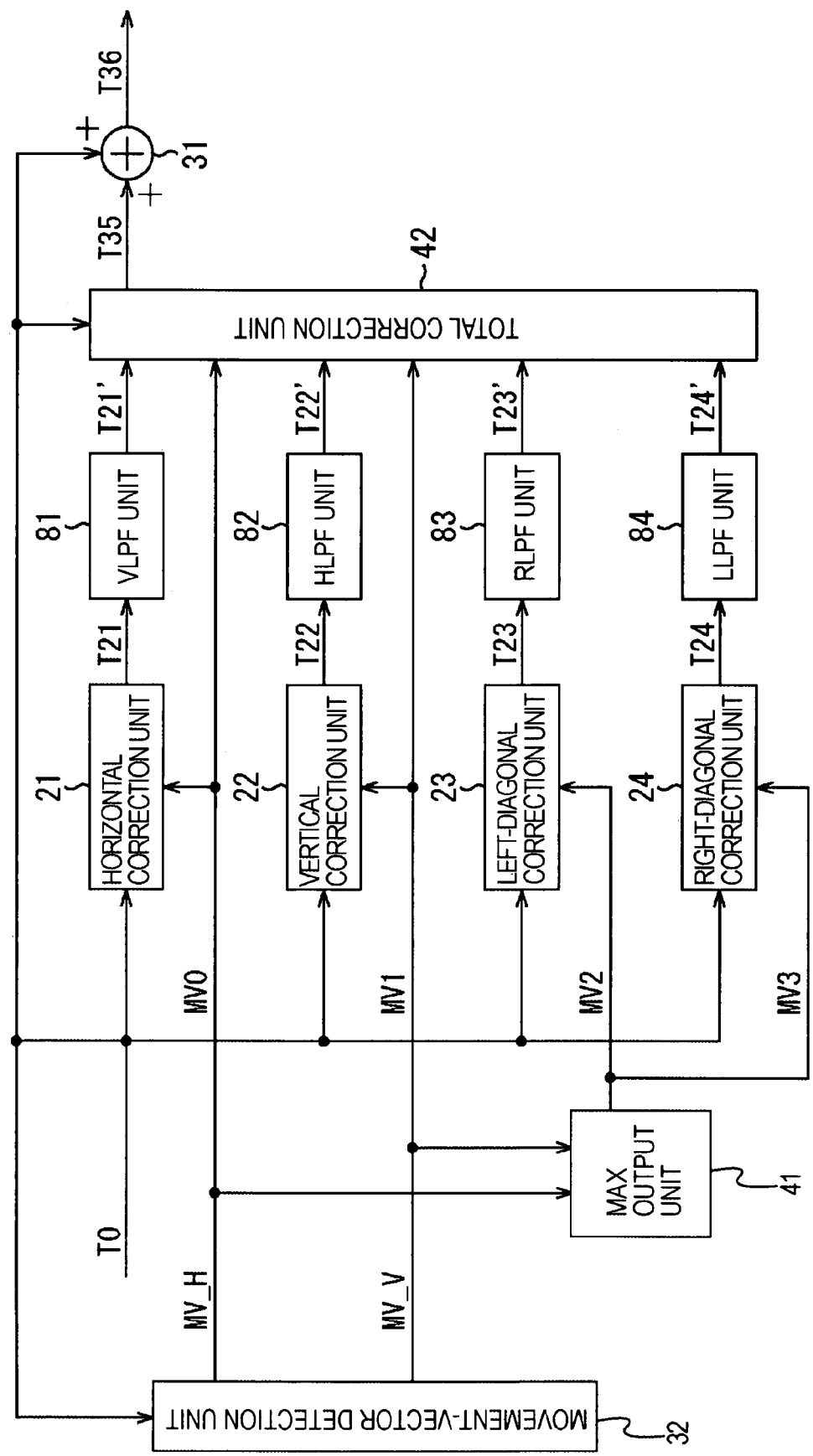
FIG. 13 is a block diagram illustrating the functional structure of an image processing apparatus according to another embodiment of the present invention.

More specifically, FIG. 13 illustrates an image processing apparatus realized by, for example, the image processing apparatus shown in FIG. 11 employing the band limitation method.

In FIG. 13, components that correspond to those in FIG. 11 are represented by the same reference numerals, and, descriptions thereof are not repeated.

The structure of an image processing apparatus shown in FIG. 13 is the same as that of the image processing apparatus shown in FIG. 11, except that a VLPF unit 81, is provided downstream of the horizontal correction unit 21 and upstream of the total correction unit 42; an HLPF unit 82 is provided downstream of the vertical correction unit 22 and upstream of the total correction unit 42; an RLPF unit 83 is provided downstream of the left-diagonal correction unit 23 and upstream of the total correction unit 42; and an LLPF unit 84 is provided downstream of the right-diagonal correction unit 24 and upstream of the total correction unit 42.

The VLPF unit 81 limits (i.e., carries out low-pass filtering on) the band of an output signal T21 from the horizontal correction unit 21 in the vertical direction orthogonal to the direction of the processing by the horizontal correction unit 21 (i.e., horizontal direction) and outputs a resulting output signal T21' to the total correction unit 42.

Similarly, the HLPF unit 82 limits (i.e., carries out low-pass filtering on) the band of an output signal T22 from the vertical correction unit 22 in the horizontal direction orthogonal to the direction of the processing by the vertical correction unit 22 (i.e., vertical direction) and outputs a resulting output signal T22' to the total correction unit 42.

The RLPF unit 83 limits (i.e., carries out low-pass filtering on) the band of the output signal T23 from the left-diagonal correction unit 23 in the 45-degree right diagonal direction orthogonal to the 45-degree left diagonal direction of the processing by the left-diagonal correction unit 23 (i.e., 45-degree left diagonal direction) and outputs a resulting output signal T23' to the total correction unit 42.

The LLPF unit 84 limits (i.e., carries out low-pass filtering on) the band of the output signal T24 from the right-diagonal correction unit 24 in the 45-degree left diagonal direction orthogonal to the 45-degree right diagonal direction of the processing by the right-diagonal correction unit 24 (i.e., 45-degree right diagonal direction) and outputs a resulting output signal T24' to the total correction unit 42.

When, for example, a plurality of horizontal lines constituting a frame (i.e., pixel values of at least one pixel disposed on the horizontal lines) are input in sequence according to the line number as an input signal T0, the VLPF unit 81, the RLPF unit 83, and the LLPF unit 84 carry out processing also on the pixels disposed on lines other the horizontal line including the target pixel (i.e., several other horizontal lines above or below the horizontal line including the target pixel). Therefore, although not illustrated in the drawing, line memories are provided upstream of the VLPF unit 81, the RLPF unit 83, and the LLPF unit 84. As a result, in some cases, the size of the circuitry in the image processing apparatus becomes large.

Accordingly, to prevent such size increase, i.e., to reduce the circuitry in the image processing apparatus to a size smaller than that illustrated in FIG. 13, the following method may be employed. This method (hereinafter referred to as a "post-combining band-limitation method") may include the steps of, first, combining the correction values of the respective directions (combining the output signals from the units 21 to 24 shown in FIG. 11) then, carrying out band limitation on the combined correction value (the output signal T35 of the total correction unit 42 shown in FIG. 11) in a predetermined direction (for example, the vertical direction), and, finally, using the band-limited combined correction value as a final total correction value (in FIG. 11, a signal obtained by band-limiting the combined correction signal T35 is supplied to the addition unit 31 as a total correction signal). In this way, only one line memory has to be provided upstream of the block carrying out band-limitation in a predetermined direction of the total correction value. Accordingly, the size of the circuitry of the image processing apparatus can be reduced.

Figure 14:
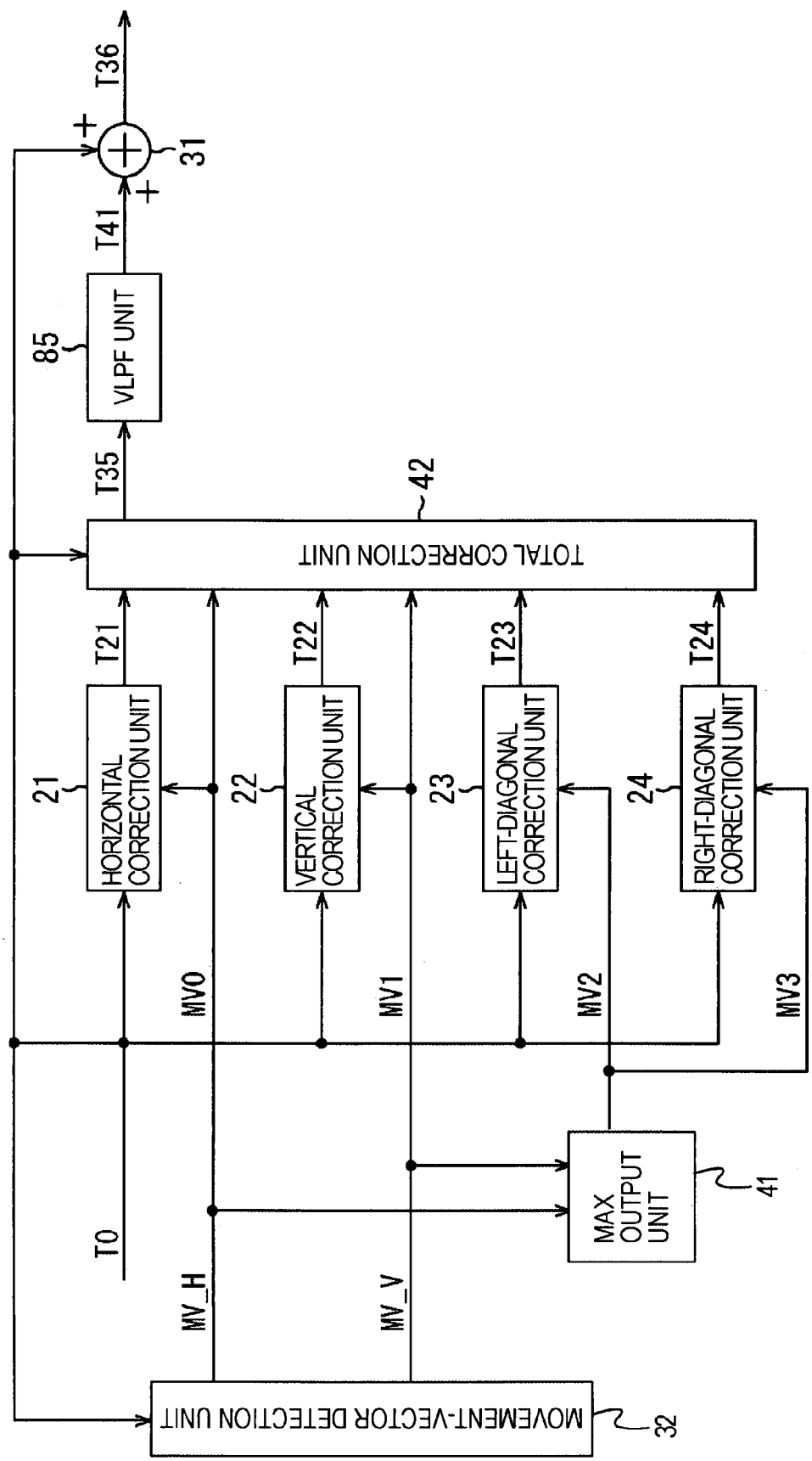
FIG. 14 is a block diagram illustrating the total or partial hardware structure of an image processing apparatus according to another embodiment of the present invention.

More specifically, in comparison with FIG. 13, FIG. 14 illustrates an image processing apparatus realized by, for example, the image processing apparatus shown in FIG. 11 employing the post-combining band-limitation method.

The image processing apparatus according to another embodiment of the present invention illustrated in FIG. 14 differs from the image processing apparatus illustrated in FIG. 11 in that a VLPF unit 85 is provided downstream of the total correction unit 42 and upstream of the addition unit 31.

The VLPF unit 85 limits (i.e., carries out low-pass filtering on) the band of the output signal (combined correction signal) T35 from the total correction unit 42 in the vertical direction so that the combined correction value obtained as a result of combining the correction values in the respective direction at the total correction unit 42 is not affected by noise. The VLPF unit 85 outputs the resulting signal T41 to the addition unit 31 as a total correction signal.

Therefore, as shown in FIG. 14, the addition unit 31 adds the output signal T41, which is the total correction signal, of the VLPF unit 85 to the input signal T0 and outputs the resulting signal T0+T41 to an external unit as a final output signal T36.

The direction of the band limitation with respect to the output signal T35 from the total correction unit 42 is the vertical direction in FIG. 14. However, the direction is not limited thereto. When enhancement is carried out to prevent blurriness in image capturing, the direction in which blurriness needs to be prevented is often the horizontal direction. Therefore, in such a case, it is desirable to select the direction orthogonal to the horizontal direction, which is the direction in which blurriness needs to be prevented, i.e., the vertical direction in FIG. 14, as the direction for carrying out band limitation on the output signal T35 from the total correction unit 42.

A case will be described below in which, with the image processing apparatus shown in FIG. 14, the input signal T0 is an image signal of an image including an object (material body) moving in the vertical direction and part of the object (image) is a target pixel. In other words, a case in which a movement vector MV_H in the horizontal direction of the target pixel is zero will be described. At this time, the output signal T35 from the total correction unit 42 is a signal corresponding to the correction value enhanced in the vertical direction. Therefore, band limitation is carried out on a correction value enhanced in the vertical direction. As a result, a problem occurs in that the characteristic of the output signal T41 is that of after passing through a band-pass filter.

Figure 15:
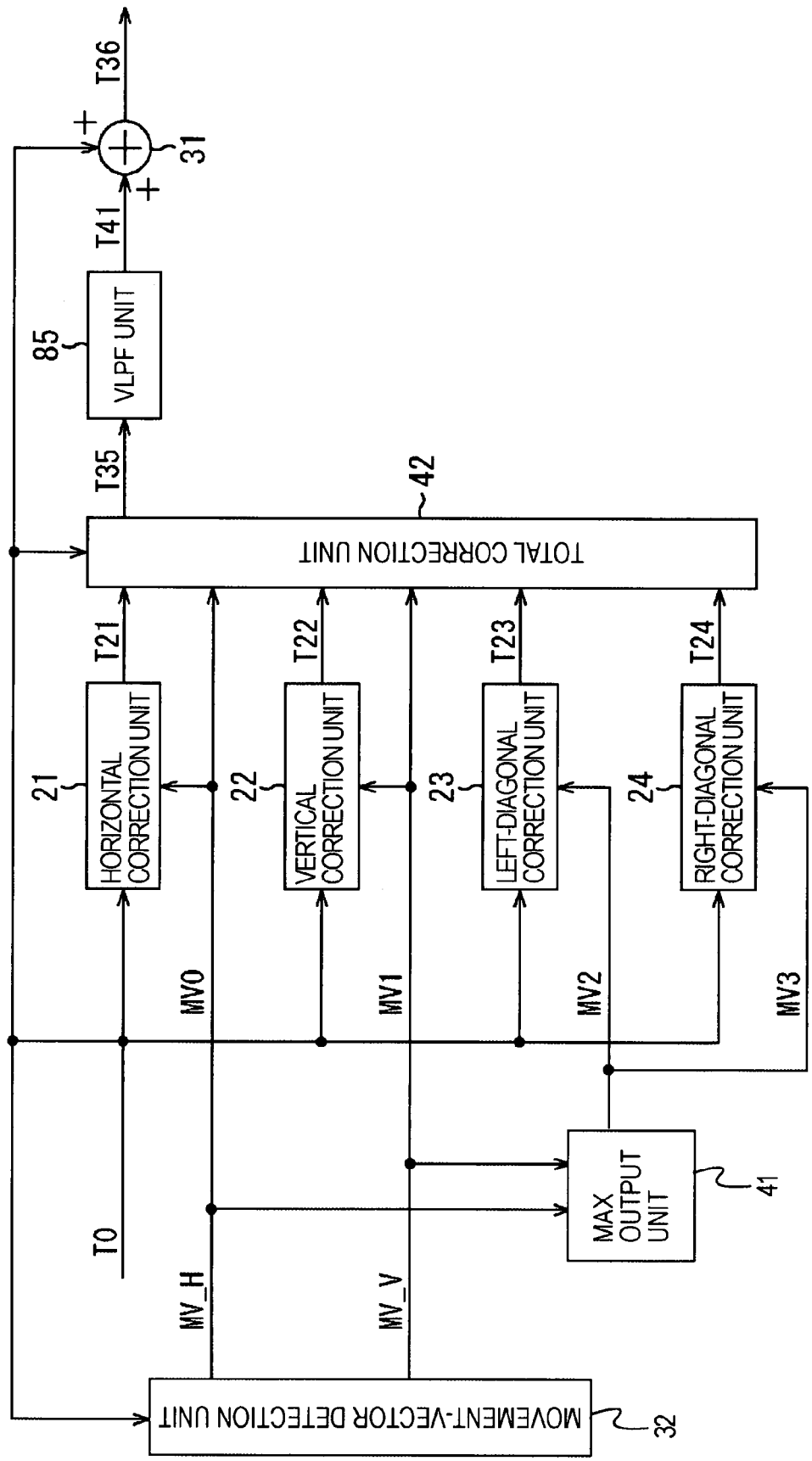
FIG. 15 is a block diagram illustrating the total or partial hardware structure of an image processing apparatus according to another embodiment of the present invention.

To solve this problem, as shown in FIG. 15, MV_H is additionally input to the VLPF unit 85, and the effect of the band limitation is adjusted (controlled) in accordance with the magnitude of the MV_H.

Figure 16:
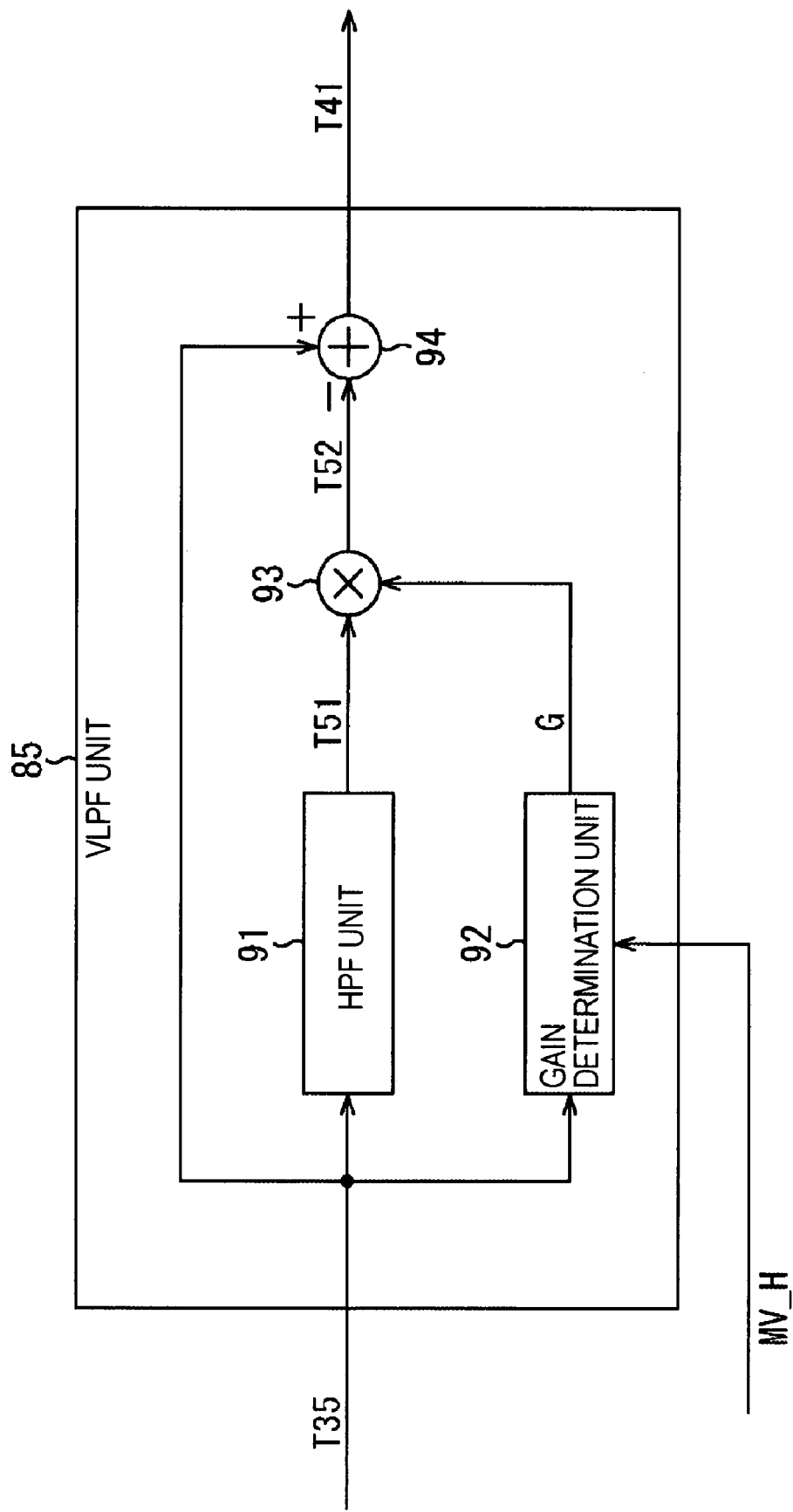
FIG. 16 is a block diagram illustrating the detailed functional structure of a VLPF unit of the image processing apparatus illustrated in FIG. 15.

More specifically, for example, the VLPF unit 85 that is capable of adjusting (controlling) the effect of the band limitation in accordance with the magnitude of the MV_H can be configured as illustrated in FIG. 16.

As shown in FIG. 16, the VLPF unit 85 includes an HPF unit 91, a gain determination unit 92, a multiplication unit 93, and a subtraction unit 94.

The output signal T35 from the total correction unit 42 is input to the HPF unit 91, the gain determination unit 92, and the subtraction unit 94 of the VLPF unit 85 as an input correction signal.

The HPF unit 91 carries out high-pass filtering on the input correction signal T35 and supplied a resulting output signal T51 to the multiplication unit 93.

Figure 17:
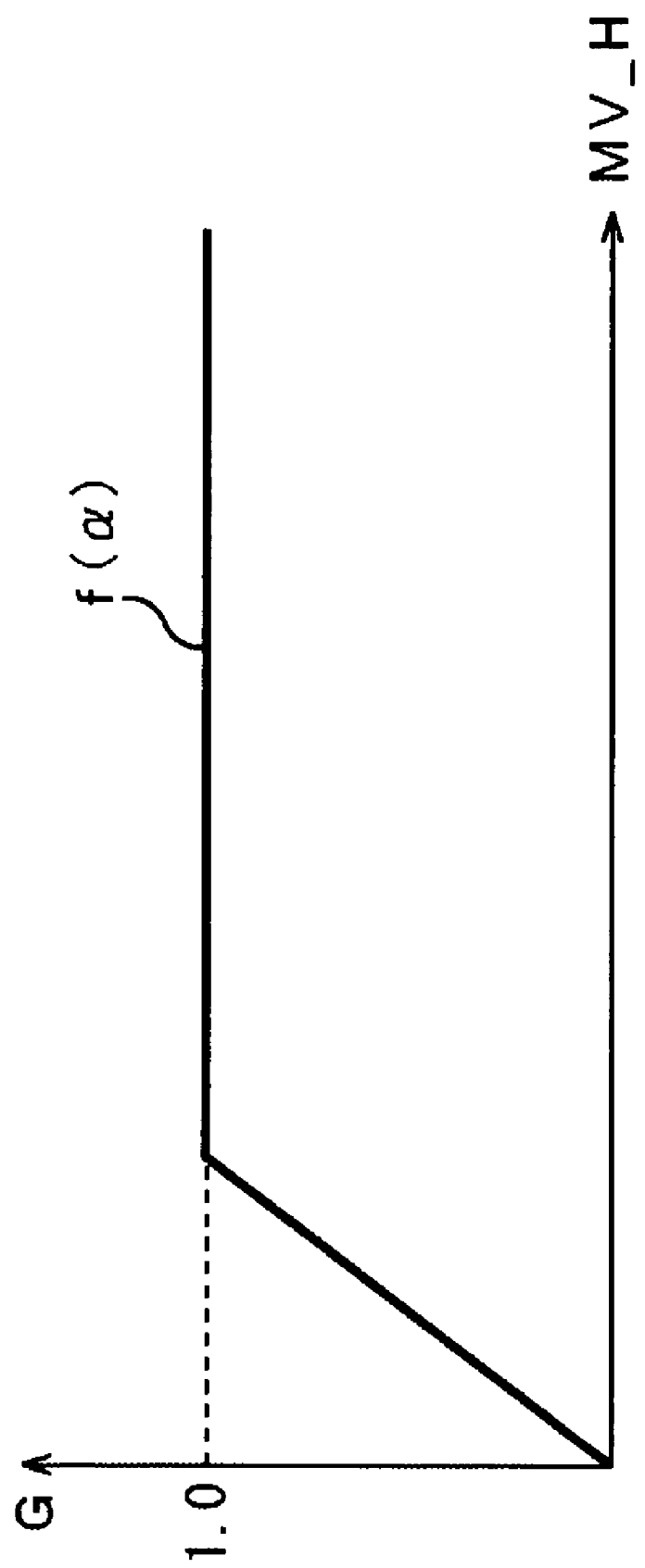
FIG. 17 illustrates the characteristic of a function held by a gain determining unit illustrated in FIG. 16.

The gain determination unit 92 holds a function f($\alpha$), such as that shown in FIG. 17. Accordingly, the gain determination unit 92 assigns the MV_H from the movement-vector detection unit 32 (refer to FIG. 15) to the function f1($\alpha$) as an input value a and supplies the output value f1(MV_H) to the multiplication unit 93 as a gain G.

The multiplication unit 93 multiplies the output signal T51 from the addition unit 31 with the gain G from the gain determination unit 92 and outputs the resulting signal G×T51 to the 94 as an output signal T52.

The subtraction unit 94 subtracts the output signal T52 from the input correction signal T35 and supplies the resulting signal T35-T52 to the addition unit 31 (refer to FIG. 15) as a total correction signal T41.

In other words, as shown in FIG. 16, the signal T51 obtained as a result of passing the input correction signal T35 through a high-pass filter is gain-adjusted in accordance with the magnitude of the MV_H so as to generate a signal T52. The signal T52 is subtracted from the input correction signal T35 so as to obtain a signal T41 that is equivalent to the signal obtained as a result of passing the input correction signal T35 through a low-pass filter. The signal T41 is output as a total correction signal.

In this case, when many of the movement components of the object are vertical components (i.e., when the object is moving in a substantially vertical direction), the MV_H becomes a small value, and, as easily grasped from the characteristic of the function f($\alpha$) shown in FIG. 17, the gain G becomes a value smaller than 1. Therefore, at the subtraction unit 94, the value subtracted from the input correction signal T35 (i.e., the level of the signal T52) becomes small compared to when the magnitude of the MV_H is great (i.e., when many of the movement components of the object are horizontal components or, in other words, when the object is moving in a substantially horizontal direction). In this way, at the VLPF unit 85 shown in FIG. 16, the effect of the band limitation is controlled in accordance with the magnitude of the MV_H.

Instead of employing a simple low-pass filter configuration, the VLPF unit 85 employs the configuration illustrated in FIG. 16 because the effect of band limitation can be controlled in accordance with the magnitude of the MV_H more easily.

An image processing apparatus according employing the post-combining band-limitation method has been described above with reference to FIGS. 14 to 16. However, the structure of the image processing apparatus is not limited thereto and is satisfactory so long as it is capable of carrying out the following processing.

In other words, it is satisfactory so long as an image processing apparatus employing the post-combining band-limitation method is capable of carrying out the following image processing on an image signal when a line is formed by disposing at least one pixel in series in a first direction, when an image is formed by disposing at least one of such line in series in a second direction orthogonal to the first direction, and when an image signal corresponding to the image is input in units of the line. More specifically, the structure of an image processing apparatus employing the post-combining band-limitation method is not limited to that illustrated in FIGS. 14 to 16 so long as the image processing apparatus is capable of enhancing the image signal in the first direction and outputting the resulting signal as a first enhanced signal; enhancing the image signal in a direction different from the first direction and outputting the resulting signals as a plurality of second enhanced signals; combining the first enhanced signal and the second enhanced signals in according to a predetermined combining method and outputting the resulting combined signal; carrying out band limitation on the combined signal in a direction different from the first direction and outputting the resulting signal as a correction signal of the image signal; adding the correction signal to the image signal and outputting the resulting signal as a corrected image signal.

More specifically, although not illustrated in the drawings, an image processing apparatus that is configured the same as that shown in FIG. 10, except that a VLPF unit (the VLPF unit 85 shown in FIG. 16) is provided downstream of the total correction unit 35 and upstream of the addition unit 31 may also be an image processing apparatus employing the post-combining band-limitation method.

The above-described process (or part of the process) can be carried out by hardware and also software.

In such a case, the image processing apparatus illustrated in FIG. 8, 10, 11, 13, 14, or 15 can be entirely or partially configured of, for example, a computer illustrated in FIG. 18.

In FIG. 18, a central processing unit (CPU) 101 execute various types of processing in accordance with a programmed stored on a read only memory (ROM) 102 or a program loaded from a storage unit 108 onto a random access memory 103. The RAM 103 also stores data required for the CPU 101 to execute the various types of processing.

The CPU 101, the ROM 102, and the RAM 103 are connected to each other via a bus 104. The bus 104 is also connected to an input/output interface 105.

The input/output interface 105 is connected to an input unit 106 including a keyboard and mouse, an output unit 107 including a display, the storage unit 108 including a hard disk, and a communication unit 109 including a modem and a terminal adapter. The communication unit 109 carries out communication with other apparatuses via a network, including the Internet.

The input/output interface 105 is also connected to a drive 110, when required. A removable medium 111, such as a magnetic disk, an optical disk, a magneto-optical disk, or a semiconductor memory, is attached to the input/output interface 105. The computer program readout via the input/output interface 105 is installed in the storage unit 108, when required.

When the series of processing is executed by software, the program constituting the software is installed from a network or a recording medium to a computer built into specialized hardware or, for example, a general-purpose personal computer that is capable of carrying out various functions by installing various programs.

As illustrated in FIG. 18, a recording medium including such a program includes, a magnetic disk (which may include a flexible disk), an optical disk (which may include a compact disk-read only memory (CD-ROM) and a digital versatile disk (DVD)), an magneto-optical disk (which may include a mini-disk (MD)), or a removable medium (packaged medium) 111. Such disk or medium stores a program and are used to distribute the program to a user, in addition to the apparatus main body. The recording medium further includes a ROM 102 that stores the program to be supplied to the user and is installed in the apparatus main body in advance and a hard disk included in the storage unit 108.

The steps of the program stored in the recording medium described in this specification may be carried out time-sequentially in the described-order. However, the steps do not necessarily have to be carried out time-sequentially and may be carried out in parallel or may be carried out individually.

As described above, a "system" described in this specification includes an entire apparatus including a plurality of processing apparatuses and processing units.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus configured to carry out image processing on image data including pixel values of a plurality of pixels disposed on a plane defined in a horizontal direction and a vertical direction, the apparatus comprising:

horizontal-direction image-processing means for carrying out image processing on an initial pixel value of a target pixel to be processed, the target pixel being included in the pixels values included in the image data, the image processing being carried out by using pixel values of a plurality of pixels, including the target pixel, disposed in a horizontal line running through the target pixel, to determine a first horizontal correction value for the target pixel;

vertical-direction image-processing means for carrying out image processing on the initial pixel value of the target pixel by using pixels values of a plurality of pixels, including the target pixel, disposed in a vertical line running through the target pixel, to determine a first vertical correction value for the target pixel;

diagonal-direction image-processing means for carrying out image processing on the initial pixel value of the target pixel by using pixels values of a plurality of pixels, including the target pixel, disposed in a predetermined diagonal line, different from the horizontal line and the vertical line, running through target pixel, to determine a first diagonal correction value for the target pixel;

re-correction means for:
setting a correction index vector having a predetermined correction direction for the target pixel;
resolving the correction index vector into a horizontal vector, a vertical vector, and a diagonal vector;
generating a second horizontal correction value for the target pixel based on the first horizontal correction value and on the resolved horizontal vector;
generating a second vertical correction value for the target pixel based on the first vertical correction value and on the resolved vertical vector; and
generating a second diagonal correction value for the target pixel based on the first diagonal correction value and on the resolved diagonal vector;

correction-value determination means for determining a total correction value for the target pixel on the basis of the second horizontal correction value for the target pixel, the second vertical correction value for the target pixel, and the second diagonal correction value for the target pixel; and correction means for correcting the initial pixel value of the target pixel by adding the total correction value for the target pixel to the initial pixel value of the target pixel to determine a final correction value for the target pixel.

2. The image processing apparatus according to claim 1, wherein the diagonal-direction image-processing means includes 45-degree left diagonal-direction image processing means for carrying out image processing on the initial pixel value of the target pixel by using pixels values of a plurality of pixels, including the target pixel, disposed in a 45-degree left diagonal line with respect to the horizontal line running through the target pixel, to determine a first left diagonal correction value for the target pixel, and 45-degree right diagonal-direction image processing means for carrying out image processing on the initial pixel value of the target pixel by using pixels values of a plurality of pixels, including the target pixel, disposed in a 45-degree right diagonal line with respect to the horizontal line running through the target pixel, to determine a first right diagonal correction value for the target pixel.

3. The image processing apparatus according to claim 2, wherein the re-correction means sets a length of the correction index vector to the magnitude of an index of the total correction value, resolves the correction index vector into vectors in the horizontal direction, the vertical direction, the 45-degree left diagonal direction, and the 45-degree right diagonal direction, and generates the second horizontal correction value for the target pixel, the second vertical correction value for the target pixel, a second left diagonal correction value for the target pixel, and second right diagonal correction value for the target pixel on the basis of the resolved vectors in the horizontal direction, the vertical direction, the 45-degree left diagonal direction, and the 45-degree right diagonal direction.

4. The image processing apparatus according to claim 3, further comprising:
movement vector detection means for detecting a movement vector of the target pixel,
wherein the image data is image data on a predetermined access unit of a plurality of access units constituting a moving image, and
wherein the re-correction means uses the movement vector detected by the movement vector detection means as the correction index vector of the target pixel.

5. A method of image processing for processing image data including pixel values of a plurality of pixels disposed on a plane defined in a horizontal direction and a vertical direction, the method comprising the steps of:
carrying out image processing on an initial pixel value of a target pixel to be processed, the target pixel being included in the pixels values included in the image data, the image processing being carried out by using pixel values of a plurality of pixels, including the target pixel, disposed in a horizontal line running through the target pixel, to determine a first horizontal correction value for the target pixel;
carrying out image processing on the initial pixel value of the target pixel by using pixels values of a plurality of pixels, including the target pixel, disposed in a vertical line running through the target pixel, to determine a first vertical correction value for the target pixel;
carrying out image processing on the initial pixel value of the target pixel by using pixels values of a plurality of pixels, including the target pixel, disposed in a predetermined diagonal line, different from the horizontal line and the vertical line, running through target pixel, to determine a first diagonal correction value for the target pixel;
setting a correction index vector having a predetermined correction direction for the target pixel;
resolving the correction index vector into a horizontal vector, vertical vector, and a diagonal vector;
generating a second horizontal correction value for the target pixel based on the first horizontal correction value and on the resolved horizontal vector;
generating a second vertical correction value for the target pixel based on the first vertical correction value and on the resolved vertical vector;
generating a second diagonal correction value for the target pixel based on the first diagonal correction value and on the resolved diagonal vector;
determining a total correction value for the target pixel on the basis of the second horizontal correction value for the target pixel, the second vertical correction value for the target pixel, and the second diagonal correction value for the target pixel; and
correcting the initial pixel value of the target pixel by adding the total correction value for the target pixel to the initial pixel value of the target pixel to determine a final correction value for the target pixel.

6. A non-transitory computer-readable storage medium storing a program for execution by an image processing apparatus on data including pixel values of a plurality of pixels disposed on a plane defined in a horizontal direction and a vertical direction to perform an image processing method, the method comprising the steps of:
carrying out image processing on an initial pixel value of a target pixel to be processed, the target pixel being included in the pixels values included in the image data, the image processing being carried out by using pixel values of a plurality of pixels, including the target pixel, disposed in a horizontal line running through the target pixel, to determine a first horizontal correction value for the target pixel;
carrying out image processing on the initial pixel value of the target pixel by using pixels values of a plurality of pixels, including the target pixel, disposed in a vertical line running through the target pixel, to determine a first vertical correction value for the target pixel;
carrying out image processing on the initial pixel value of the target pixel by using pixels values of a plurality of pixels, including the target pixel, disposed in a predetermined line, different from the horizontal line and the vertical line, running through target pixel, to determine a first diagonal correction value for the target pixel;
setting a correction index vector having a predetermined correction direction for the target pixel;
resolving the correction index vector into a horizontal vector, vertical vector, and a diagonal vector;
generating a second horizontal correction value for the target pixel based on the first horizontal correction value and on the resolved horizontal vector;
generating a second vertical correction value for the target pixel based on the first vertical correction value and on the resolved vertical vector;
generating a second diagonal correction value for the target pixel based on the first diagonal correction value and on the resolved diagonal vector;
determining a total correction value for the target pixel on the basis of the second horizontal correction value for the target pixel, the vertical correction value for the target pixel, and the diagonal correction value for the target pixel; and
correcting the initial pixel value of the target pixel by adding the total correction value for the target pixel to the initial pixel value of the target pixel to determine a final correction value for the target pixel.

* * * * *